(12) United States Patent (10) Patent No.: US 9,189,129 B2
Cassistat et al. (45) Date of Patent: Nov. 17, 2015

(54) NON-HOMOGENEOUS OBJECTS MAGNIFICATION AND REDUCTION

(75) Inventors: Francois Cassistat, Montreal (CA); Mathieu Audet, Montreal (CA)

(73) Assignee: 9224-5489 QUEBEC INC., Montreal (CA)

( * ) Notice: Subject to any disclaimer, the term of this patent is extended or adjusted under 35 U.S.C. 154(b) by 737 days.

(21) Appl. No.: 13/244,589

(22) Filed: Sep. 25, 2011

(65) Prior Publication Data

US 2012/0249581 A1 Oct. 4, 2012

Related U.S. Application Data

(60) Provisional application No. 61/438,609, filed on Feb. 1, 2011.

(51) Int. Cl.
*G06F 3/048* (2013.01)
*G06F 3/0482* (2013.01)
*G06F 17/30* (2006.01)
*G06F 3/0481* (2013.01)

(52) U.S. Cl.
CPC .......... *G06F 3/0482* (2013.01); *G06F 3/04817* (2013.01); *G06F 17/30011* (2013.01); *G06F 17/30598* (2013.01)

(58) Field of Classification Search
None
See application file for complete search history.

(56) References Cited

U.S. PATENT DOCUMENTS

| | | | |
|---|---|---|---|
| 4,616,336 A | 10/1986 | Robertson | |
| 4,653,021 A | 3/1987 | Takagi | |
| 4,817,036 A | 3/1989 | Millet et al. | |
| 5,115,504 A | 5/1992 | Belove | |
| 5,148,154 A | 9/1992 | MacKay | |
| 5,241,624 A | 8/1993 | Torres | |
| 5,261,087 A | 11/1993 | Mukaino | |
| 5,398,074 A | 3/1995 | Duffield | |
| 5,414,811 A | 5/1995 | Parulski et al. | |
| 5,499,330 A | 3/1996 | Lucas et al. | |
| 5,524,195 A | 6/1996 | Clanton | |
| 5,535,063 A | 7/1996 | Lamming | |
| 5,546,528 A | 8/1996 | Johnston | |
| 5,581,752 A | 12/1996 | Inoue | |

(Continued)

FOREIGN PATENT DOCUMENTS

| | | |
|---|---|---|
| JP | 07-013971 | 1/1995 |
| JP | 07-085080 | 3/1995 |

(Continued)

OTHER PUBLICATIONS

The lifestream approach to reorganizing the information world; Nicolas Carriero, Scott Fertig; Eric Freeman and David Gelernter; Apr. 1995; Yale University.

*Primary Examiner* — David H Chu
(74) *Attorney, Agent, or Firm* — Mathieu Audet

(57) ABSTRACT

Is provided herein a method of non-homogeneously magnifying objects comprising providing an information element adapted to be displayed on a display and surrounded by a margin thereof; displaying the information element and its margin on a display; defining a standardized object adapted to respectively include therein the information element and at least a portion of the margin; magnifying the standardized object; defining a size of the magnified information element by removing an unmagnified size of the at least a portion of the margin to the size of the magnified standardized object; and displaying the magnified information element with its surrounding margin.

19 Claims, 19 Drawing Sheets

(56) References Cited

U.S. PATENT DOCUMENTS

| | | | |
|---|---|---|---|
| 5,598,519 A | 1/1997 | Narayanan | |
| 5,602,596 A | 2/1997 | Claussen | |
| 5,606,374 A | 2/1997 | Bertram | |
| 5,621,456 A | 4/1997 | Florin | |
| 5,621,874 A | 4/1997 | Lucas | |
| 5,623,613 A | 4/1997 | Rowe | |
| 5,634,064 A | 5/1997 | Warnock | |
| 5,649,182 A | 7/1997 | Reitz | |
| 5,659,742 A | 8/1997 | Beattie | |
| 5,663,757 A | 9/1997 | Morales | |
| 5,671,381 A | 9/1997 | Strasnick | |
| 5,673,401 A | 9/1997 | Volk | |
| 5,677,708 A | 10/1997 | Mattews | |
| 5,680,605 A | 10/1997 | Torres | |
| 5,682,511 A | 10/1997 | Sposato | |
| 5,701,500 A | 12/1997 | Ikeo | |
| 5,713,031 A | 1/1998 | Saito | |
| 5,740,815 A | 4/1998 | Alpins | |
| 5,760,772 A * | 6/1998 | Austin | 715/798 |
| 5,781,188 A | 7/1998 | Amiot | |
| 5,781,785 A | 7/1998 | Rowe | |
| 5,794,178 A | 8/1998 | Caid | |
| 5,798,766 A | 8/1998 | Hayashi et al. | |
| 5,812,124 A | 9/1998 | Eick | |
| 5,822,751 A | 10/1998 | Gray | |
| 5,832,504 A | 11/1998 | Tripathi | |
| 5,838,317 A | 11/1998 | Bolnick | |
| 5,838,326 A | 11/1998 | Card | |
| 5,847,707 A | 12/1998 | Hayashida | |
| 5,850,218 A | 12/1998 | Lajoie | |
| 5,878,410 A | 3/1999 | Zbikowski | |
| 5,900,879 A | 5/1999 | Berry | |
| 5,903,271 A | 5/1999 | Bardon | |
| 5,905,992 A | 5/1999 | Lucas | |
| 5,920,859 A | 7/1999 | Li | |
| 5,926,824 A | 7/1999 | Hashimoto | |
| 5,933,843 A | 8/1999 | Takai | |
| 5,974,391 A | 10/1999 | Hongawa et al. | |
| 5,977,974 A | 11/1999 | Hatori et al. | |
| 5,980,096 A | 11/1999 | Thalhammer-Reyero | |
| 5,982,369 A | 11/1999 | Sciammarella | |
| 6,003,034 A | 12/1999 | Thli | |
| 6,005,601 A | 12/1999 | Ohkura | |
| 6,006,227 A | 12/1999 | Freeman | |
| 6,009,442 A | 12/1999 | Chen | |
| 6,012,072 A | 1/2000 | Lucas | |
| 6,020,930 A | 2/2000 | Legrand | |
| 6,023,703 A | 2/2000 | Hill | |
| 6,028,600 A | 2/2000 | Rosin | |
| 6,029,164 A | 2/2000 | Birrell | |
| 6,037,933 A | 3/2000 | Blonstein | |
| 6,038,522 A | 3/2000 | Manson et al. | |
| 6,064,384 A | 5/2000 | Ho | |
| 6,067,554 A | 5/2000 | Hohensee | |
| 6,081,817 A | 6/2000 | Taguchi | |
| 6,088,032 A | 7/2000 | Mackinlay | |
| 6,100,887 A | 8/2000 | Bormann et al. | |
| 6,108,657 A | 8/2000 | Shoup | |
| 6,111,578 A | 8/2000 | Tesler | |
| 6,119,120 A | 9/2000 | Miller | |
| 6,149,519 A | 11/2000 | Osaki | |
| 6,151,059 A | 11/2000 | Schein | |
| 6,151,604 A | 11/2000 | Wlaschin | |
| 6,151,702 A | 11/2000 | Overturf | |
| 6,163,345 A | 12/2000 | Noguchi | |
| 6,175,362 B1 | 1/2001 | Harms | |
| 6,175,845 B1 | 1/2001 | Smith | |
| 6,185,551 B1 | 2/2001 | Birrell | |
| 6,188,406 B1 | 2/2001 | Fong | |
| 6,189,012 B1 | 2/2001 | Mital | |
| 6,202,068 B1 | 3/2001 | Kraay | |
| 6,211,873 B1 | 4/2001 | Moyer | |
| 6,236,994 B1 | 5/2001 | Swartz | |
| 6,237,004 B1 | 5/2001 | Dodson | |
| 6,240,421 B1 | 5/2001 | Stolarz | |
| 6,243,093 B1 | 6/2001 | Czerwinski | |
| 6,243,724 B1 | 6/2001 | Mander | |
| 6,253,218 B1 | 6/2001 | Aoki | |
| 6,262,722 B1 | 7/2001 | Allison | |
| 6,266,059 B1 | 7/2001 | Mattews | |
| 6,266,098 B1 | 7/2001 | Cove | |
| 6,281,898 B1 | 8/2001 | Nikolovska | |
| 6,281,940 B1 | 8/2001 | Sciammarella | |
| 6,289,362 B1 | 9/2001 | Van Der Meer | |
| 6,295,639 B1 | 9/2001 | Van Der Meer | |
| 6,308,187 B1 | 10/2001 | Destefano | |
| 6,310,622 B1 | 10/2001 | Asente | |
| 6,313,851 B1 | 11/2001 | Matthews | |
| 6,317,761 B1 | 11/2001 | Landsman et al. | |
| 6,335,742 B1 | 1/2002 | Takemoto | |
| 6,337,698 B1 | 1/2002 | Keely | |
| 6,338,044 B1 | 1/2002 | Cook et al. | |
| 6,344,880 B1 | 2/2002 | Takahashi | |
| 6,353,831 B1 | 3/2002 | Gustman | |
| 6,366,299 B1 | 4/2002 | Lanning | |
| 6,381,362 B1 | 4/2002 | Deshpande et al. | |
| 6,388,665 B1 | 5/2002 | Linnett | |
| 6,392,651 B1 | 5/2002 | Stradley | |
| 6,418,556 B1 | 7/2002 | Bennington | |
| 6,425,129 B1 | 7/2002 | Sciammarella | |
| 6,434,545 B1 | 8/2002 | MacLeod et al. | |
| 6,434,598 B1 | 8/2002 | Gish | |
| 6,456,938 B1 | 9/2002 | Barnard | |
| 6,457,006 B1 | 9/2002 | Gruenwald | |
| 6,457,017 B2 | 9/2002 | Watkins | |
| 6,463,431 B1 | 10/2002 | Schmitt | |
| 6,466,237 B1 | 10/2002 | Miyao et al. | |
| 6,487,557 B1 | 11/2002 | Nagatomo et al. | |
| 6,491,585 B1 | 12/2002 | Miyamoto | |
| 6,501,469 B1 | 12/2002 | MacPhail | |
| 6,507,858 B1 | 1/2003 | Kanerva | |
| 6,538,672 B1 | 3/2003 | Dobbelaar | |
| 6,542,896 B1 | 4/2003 | Gruenwald | |
| 6,553,310 B1 | 4/2003 | Lopke | |
| 6,556,225 B1 | 4/2003 | MacPhail | |
| 6,577,350 B1 | 6/2003 | Proehl | |
| 6,581,068 B1 | 6/2003 | Bensoussan et al. | |
| 6,587,106 B1 | 7/2003 | Suzuki et al. | |
| 6,594,673 B1 | 7/2003 | Smith | |
| 6,598,043 B1 | 7/2003 | Baclawski | |
| 6,600,501 B1 | 7/2003 | Israel | |
| D478,090 S | 8/2003 | Nguyen | |
| 6,604,144 B1 | 8/2003 | Anders | |
| 6,613,100 B2 | 9/2003 | Miller | |
| 6,636,246 B1 | 10/2003 | Gallo | |
| 6,638,313 B1 | 10/2003 | Freeman | |
| 6,642,939 B1 | 11/2003 | Vallone | |
| 6,650,343 B1 | 11/2003 | Fujita | |
| 6,662,357 B1 | 12/2003 | Bowman-Amuah | |
| 6,668,102 B2 | 12/2003 | Chiba | |
| 6,671,692 B1 | 12/2003 | Marpe | |
| 6,671,693 B1 | 12/2003 | Marpe | |
| 6,671,694 B2 | 12/2003 | Baskins et al. | |
| 6,675,158 B1 | 1/2004 | Rising | |
| 6,678,671 B1 | 1/2004 | Petrovic | |
| 6,678,694 B1 | 1/2004 | Zimmermann | |
| 6,678,891 B1 | 1/2004 | Wilcox | |
| 6,684,249 B1 | 1/2004 | Frerichs et al. | |
| 6,690,391 B1 | 2/2004 | Proehl | |
| 6,691,127 B1 | 2/2004 | Bauer | |
| 6,694,326 B2 | 2/2004 | Mayhew | |
| 6,694,335 B1 | 2/2004 | Hopmann | |
| 6,694,486 B2 | 2/2004 | Frank | |
| 6,701,318 B2 | 3/2004 | Fox | |
| 6,704,727 B1 | 3/2004 | Kravets | |
| 6,704,744 B1 | 3/2004 | Williamson | |
| 6,721,760 B1 | 4/2004 | Ono et al. | |
| 6,725,232 B2 | 4/2004 | Bradley | |
| 6,725,427 B2 | 4/2004 | Freeman | |
| 6,735,591 B2 | 5/2004 | Khan | |
| 6,738,787 B2 | 5/2004 | Stead | |
| 6,744,447 B2 | 6/2004 | Estrada et al. | |
| 6,744,967 B2 | 6/2004 | Kaminski et al. | |
| 6,754,660 B1 | 6/2004 | MacPhail | |

(56) References Cited

U.S. PATENT DOCUMENTS

| | | |
|---|---|---|
| 6,768,999 B2 | 7/2004 | Prager |
| 6,772,148 B2 | 8/2004 | Baclawski |
| 6,859,803 B2 | 2/2005 | Dagtas |
| 6,862,027 B2 | 3/2005 | Andrews |
| 6,865,717 B2 | 3/2005 | Wright et al. |
| 6,879,946 B2 | 4/2005 | Rong |
| 6,889,220 B2 | 5/2005 | Wolff |
| 6,900,807 B1 | 5/2005 | Liongosari et al. |
| 6,901,558 B1 | 5/2005 | Andreas et al. |
| 6,915,254 B1 | 7/2005 | Heinze |
| 6,915,489 B2 | 7/2005 | Gargi |
| 6,922,699 B2 | 7/2005 | Schuetze |
| 6,925,611 B2 | 8/2005 | SanGiovanni |
| 6,927,770 B2 | 8/2005 | Ording et al. |
| 6,934,916 B1 | 8/2005 | Webb et al. |
| 6,948,124 B2 | 9/2005 | Combs |
| 6,961,900 B1 | 11/2005 | Sprague et al. |
| 6,965,380 B1 | 11/2005 | Kumata et al. |
| 6,973,628 B2 | 12/2005 | Asami |
| 6,983,227 B1 | 1/2006 | Thalhammer-Reyero et al. |
| 6,985,948 B2 | 1/2006 | Taguchi et al. |
| 6,987,220 B2 | 1/2006 | Holcombe |
| 7,007,034 B1 | 2/2006 | Hartman |
| 7,010,744 B1 | 3/2006 | Torgerson |
| 7,019,741 B2 | 3/2006 | Kelly et al. |
| 7,020,848 B2 | 3/2006 | Rosenzweig |
| 7,055,104 B1 | 5/2006 | Billmaier |
| 7,080,394 B2 | 7/2006 | Istvan |
| 7,088,859 B1 | 8/2006 | Yamaguchi |
| 7,107,531 B2 | 9/2006 | Billmaier |
| 7,107,532 B1 | 9/2006 | Billmaier |
| 7,113,975 B2 | 9/2006 | Nakayama |
| 7,117,199 B2 | 10/2006 | Frank |
| 7,137,067 B2 | 11/2006 | Yanase |
| 7,139,006 B2 | 11/2006 | Wittenburg |
| 7,149,983 B1 | 12/2006 | Robertson |
| 7,155,675 B2 | 12/2006 | Billmaier |
| 7,159,177 B2 | 1/2007 | Billmaier |
| 7,199,809 B1 | 4/2007 | Lacy |
| 7,234,114 B2 | 6/2007 | Kurtz |
| 7,266,768 B2 | 9/2007 | Ferlitsch |
| 7,289,981 B2 | 10/2007 | Chang |
| 7,290,698 B2 | 11/2007 | Poslinski et al. |
| 7,293,228 B1 | 11/2007 | Lessing et al. |
| 7,302,649 B2 | 11/2007 | Ohnishi |
| 7,318,196 B2 | 1/2008 | Crow et al. |
| 7,334,191 B1 | 2/2008 | Sivan |
| 7,346,600 B2 | 3/2008 | Nakao |
| 7,346,850 B2 | 3/2008 | Swartz |
| 7,350,157 B1 | 3/2008 | Billmaier |
| 7,353,461 B2 | 4/2008 | Davidsson |
| 7,380,260 B1 | 5/2008 | Billmaier |
| 7,418,674 B2 | 8/2008 | Robbins |
| 7,444,598 B2 | 10/2008 | Horvitz |
| 7,447,713 B1 | 11/2008 | Berkheimer |
| 7,448,950 B2 | 11/2008 | Matsumoto |
| 7,458,033 B2 | 11/2008 | Bacigalupi et al. |
| 7,502,819 B2 | 3/2009 | Alonso |
| D589,972 S | 4/2009 | Casagrande et al. |
| 7,594,246 B1 | 9/2009 | Billmaier |
| 7,606,819 B2 | 10/2009 | Audet |
| 7,607,104 B2 | 10/2009 | Maeda |
| 7,629,527 B2 | 12/2009 | Hiner |
| 7,650,569 B1 | 1/2010 | Allen |
| 7,661,075 B2 | 2/2010 | Lahdesmaki |
| 7,680,817 B2 | 3/2010 | Audet |
| 7,681,128 B2 | 3/2010 | Yamamoto |
| 7,681,149 B2 | 3/2010 | Lahdesmaki |
| D614,197 S | 4/2010 | Casagrande |
| 7,703,040 B2 | 4/2010 | Cutrell |
| 7,710,423 B2 | 5/2010 | Drucker et al. |
| 7,735,102 B1 | 6/2010 | Billmaier |
| 7,757,253 B2 | 7/2010 | Rappaport |
| 7,761,471 B1 | 7/2010 | Lee |
| 7,765,184 B2 | 7/2010 | Makela |
| 7,765,195 B2 | 7/2010 | Miller |
| 7,770,117 B1 | 8/2010 | Uy |
| 7,788,247 B2 | 8/2010 | Wang |
| 7,788,592 B2 | 8/2010 | William |
| 7,792,328 B2 | 9/2010 | Albertson et al. |
| 7,818,378 B2 | 10/2010 | Buchheit et al. |
| 7,822,735 B2 | 10/2010 | Suda |
| 7,844,074 B2 | 11/2010 | Moskowitz et al. |
| 7,870,489 B2 | 1/2011 | Serita |
| 7,899,818 B2 | 3/2011 | Stonehocker |
| 7,902,741 B2 | 3/2011 | Iwanaga |
| 7,991,720 B2 | 8/2011 | Mander |
| 8,001,481 B2 | 8/2011 | Chakra et al. |
| 8,010,508 B2 | 8/2011 | Audet |
| 8,010,892 B2 | 8/2011 | Audet |
| 8,069,404 B2 | 11/2011 | Audet |
| 8,078,966 B2 | 12/2011 | Audet |
| 8,099,680 B1 | 1/2012 | Kolde |
| 8,136,030 B2 | 3/2012 | Audet |
| 8,151,185 B2 | 4/2012 | Audet |
| 2001/0025288 A1 | 9/2001 | Yanase |
| 2001/0034766 A1 | 10/2001 | Morimoto |
| 2001/0055017 A1 | 12/2001 | Ording |
| 2002/0033848 A1 | 3/2002 | Sclammarello |
| 2002/0035563 A1 | 3/2002 | Suda |
| 2002/0056129 A1 | 5/2002 | Blackketter |
| 2002/0059215 A1 | 5/2002 | Kotani et al. |
| 2002/0070958 A1 | 6/2002 | Yeo |
| 2002/0078440 A1 | 6/2002 | Feinberg |
| 2002/0087530 A1 | 7/2002 | Smith |
| 2002/0096831 A1 | 7/2002 | Nakayama |
| 2002/0101458 A1 | 8/2002 | SanGiovanni |
| 2002/0152474 A1 | 10/2002 | Dudkiewicz |
| 2002/0180795 A1 | 12/2002 | Wright et al. |
| 2003/0001898 A1 | 1/2003 | Bernhardson |
| 2003/0001901 A1 | 1/2003 | Crinon et al. |
| 2003/0037051 A1 | 2/2003 | Gruenwald |
| 2003/0046693 A1 | 3/2003 | Billmaier |
| 2003/0046694 A1 | 3/2003 | Istvan |
| 2003/0046695 A1 | 3/2003 | Billmaier |
| 2003/0052900 A1 | 3/2003 | Card |
| 2003/0090524 A1 | 5/2003 | Segerberg |
| 2003/0093260 A1 | 5/2003 | Dagtas |
| 2003/0093792 A1 | 5/2003 | Labeeb |
| 2003/0120681 A1 | 6/2003 | Baclawski |
| 2003/0120737 A1 | 6/2003 | Lytle |
| 2003/0121055 A1 | 6/2003 | Kaminski et al. |
| 2003/0128228 A1 | 7/2003 | Crow et al. |
| 2003/0132971 A1 | 7/2003 | Billmaier |
| 2003/0149939 A1 | 8/2003 | Hubel |
| 2003/0163468 A1 | 8/2003 | Freeman |
| 2003/0167902 A1 | 9/2003 | Hiner |
| 2003/0190950 A1 | 10/2003 | Matsumoto |
| 2003/0237047 A1 | 12/2003 | Borson |
| 2004/0003398 A1 | 1/2004 | Donian et al. |
| 2004/0024738 A1 | 2/2004 | Yamane |
| 2004/0054968 A1 | 3/2004 | Savage |
| 2004/0064473 A1 | 4/2004 | Thomas |
| 2004/0090439 A1 | 5/2004 | Dillner |
| 2004/0111401 A1 | 6/2004 | Chang |
| 2004/0125143 A1 | 7/2004 | Deaton |
| 2004/0128277 A1 | 7/2004 | Mander |
| 2004/0128377 A1 | 7/2004 | Sadaghiany |
| 2004/0139143 A1 | 7/2004 | Canakapalli |
| 2004/0150657 A1 | 8/2004 | Wittenburg |
| 2004/0233238 A1 | 11/2004 | Lahdesmaki |
| 2004/0233239 A1 | 11/2004 | Lahdesmaki |
| 2004/0263519 A1 | 12/2004 | Andrews |
| 2005/0060667 A1 | 3/2005 | Robins |
| 2005/0119936 A1 | 6/2005 | Buchanan et al. |
| 2006/0013554 A1 | 1/2006 | Poslinski et al. |
| 2006/0013555 A1 | 1/2006 | Poslinski et al. |
| 2006/0013556 A1 | 1/2006 | Poslinski et al. |
| 2006/0013557 A1 | 1/2006 | Poslinski et al. |
| 2006/0020966 A1 | 1/2006 | Poslinski et al. |
| 2006/0020971 A1 | 1/2006 | Poslinski et al. |
| 2006/0045470 A1 | 3/2006 | Poslinski et al. |
| 2006/0136466 A1 | 6/2006 | Weiner |
| 2006/0209069 A1 | 9/2006 | Bacigalupi et al. |

(56) References Cited

U.S. PATENT DOCUMENTS

| | | |
|---|---|---|
| 2006/0242178 A1 | 10/2006 | Butterfield |
| 2006/0248129 A1 | 11/2006 | Carnes |
| 2006/0259511 A1 | 11/2006 | Boerries |
| 2007/0005576 A1 | 1/2007 | Cutrell |
| 2007/0007884 A1 | 1/2007 | Iwanaga |
| 2007/0061855 A1 | 3/2007 | Serita |
| 2007/0067290 A1 | 3/2007 | Makela |
| 2007/0083527 A1 | 4/2007 | Wadler et al. |
| 2007/0143803 A1 | 6/2007 | Lim et al. |
| 2007/0156654 A1 | 7/2007 | Ravinarayanan |
| 2007/0168877 A1 | 7/2007 | Jain et al. |
| 2007/0171224 A1 | 7/2007 | MacPherson |
| 2007/0204218 A1 | 8/2007 | Weber |
| 2007/0214169 A1 | 9/2007 | Audet |
| 2007/0216694 A1 | 9/2007 | Audet |
| 2007/0220209 A1 | 9/2007 | Maeda et al. |
| 2007/0239676 A1 | 10/2007 | Stonehocker |
| 2007/0271508 A1 | 11/2007 | Audet |
| 2008/0000126 A1 | 1/2008 | Teza |
| 2008/0016142 A1 | 1/2008 | Schneider |
| 2008/0019371 A1 | 1/2008 | Anschutz |
| 2008/0022199 A1 | 1/2008 | Sako |
| 2008/0058106 A1 | 3/2008 | Audet |
| 2008/0071822 A1 | 3/2008 | Audet |
| 2008/0072169 A1 | 3/2008 | Audet |
| 2008/0092038 A1 | 4/2008 | Audet |
| 2008/0098323 A1 | 4/2008 | Vallone et al. |
| 2008/0104534 A1 | 5/2008 | Park et al. |
| 2008/0118219 A1 | 5/2008 | Chang et al. |
| 2008/0133579 A1 | 6/2008 | Lim |
| 2008/0134013 A1 | 6/2008 | Audet |
| 2008/0134022 A1 | 6/2008 | Audet |
| 2008/0141115 A1 | 6/2008 | Audet |
| 2008/0243778 A1 | 10/2008 | Behnen |
| 2008/0244437 A1 | 10/2008 | Fischer et al. |
| 2008/0256473 A1 | 10/2008 | Chakra et al. |
| 2008/0256474 A1 | 10/2008 | Chakra et al. |
| 2008/0270361 A1 | 10/2008 | Meyer |
| 2008/0270928 A1 | 10/2008 | Chakra et al. |
| 2008/0295016 A1 | 11/2008 | Audet |
| 2008/0299989 A1 | 12/2008 | King |
| 2008/0307348 A1 | 12/2008 | Jones et al. |
| 2009/0019371 A1 | 1/2009 | Audet |
| 2009/0048981 A1 | 2/2009 | Millan |
| 2009/0055413 A1 | 2/2009 | Audet |
| 2009/0055726 A1 | 2/2009 | Audet |
| 2009/0055729 A1 | 2/2009 | Audet |
| 2009/0055763 A1 | 2/2009 | Audet |
| 2009/0055776 A1 | 2/2009 | Audet |
| 2009/0063552 A1 | 3/2009 | Jones |
| 2009/0064143 A1 | 3/2009 | Bhogal et al. |
| 2009/0070662 A1 | 3/2009 | Audet |
| 2009/0070699 A1 | 3/2009 | Birkill et al. |
| 2009/0083260 A1 | 3/2009 | Artom |
| 2009/0083859 A1 | 3/2009 | Roth et al. |
| 2009/0106684 A1 | 4/2009 | Chakra et al. |
| 2009/0106685 A1 | 4/2009 | Care et al. |
| 2009/0113334 A1 | 4/2009 | Chakra et al. |
| 2009/0116817 A1 | 5/2009 | Kim et al. |
| 2009/0150832 A1 | 6/2009 | Keller et al. |
| 2009/0164933 A1 | 6/2009 | Pederson et al. |
| 2009/0199119 A1 | 8/2009 | Park et al. |
| 2009/0228788 A1 | 9/2009 | Audet |
| 2009/0235194 A1 | 9/2009 | Arndt et al. |
| 2009/0254850 A1 | 10/2009 | Almeida |
| 2009/0284658 A1 | 11/2009 | Cho |
| 2009/0287693 A1 | 11/2009 | Audet |
| 2009/0288006 A1 | 11/2009 | Audet |
| 2009/0319933 A1 | 12/2009 | Zaika et al. |
| 2010/0057576 A1 | 3/2010 | Brodersen et al. |
| 2010/0082427 A1 | 4/2010 | Burgener |
| 2010/0082653 A1 | 4/2010 | Nair |
| 2010/0083159 A1 | 4/2010 | Mountain et al. |
| 2010/0094890 A1 | 4/2010 | Bokor |
| 2010/0145976 A1 | 6/2010 | Higgins |
| 2010/0150522 A1 | 6/2010 | Schmehl et al. |
| 2010/0169823 A1 | 7/2010 | Audet |
| 2010/0171861 A1 | 7/2010 | Ota et al. |
| 2010/0185509 A1 | 7/2010 | Higgins |
| 2010/0313158 A1 | 12/2010 | Lee et al. |
| 2010/0313159 A1 | 12/2010 | Decker et al. |
| 2010/0318200 A1 | 12/2010 | Foslien et al. |
| 2010/0325132 A1 | 12/2010 | Liu |
| 2010/0325134 A1 | 12/2010 | Galfond |
| 2010/0332512 A1 | 12/2010 | Shpits |
| 2010/0333031 A1 | 12/2010 | Castelli |
| 2011/0061082 A1 | 3/2011 | Heo et al. |
| 2011/0078166 A1 | 3/2011 | Oliver |
| 2011/0145745 A1 | 6/2011 | Hyeon et al. |
| 2011/0154213 A1 | 6/2011 | Wheatley et al. |
| 2011/0246926 A1 | 10/2011 | Newton |
| 2011/0307814 A1 | 12/2011 | Audet |
| 2012/0159320 A1 | 6/2012 | Audet |
| 2012/0198385 A1 | 8/2012 | Audet |
| 2012/0198389 A1 | 8/2012 | Audet |
| 2012/0249581 A1 | 10/2012 | Cassistat |
| 2012/0260204 A1 | 10/2012 | Audet |
| 2013/0080880 A1 | 3/2013 | Cassistat |
| 2013/0080888 A1 | 3/2013 | Audet |

FOREIGN PATENT DOCUMENTS

| | | |
|---|---|---|
| JP | 08-016612 | 1/1996 |
| JP | 09-016809 | 1/1997 |
| JP | 09-265480 | 10/1997 |
| JP | 09-288659 | 11/1997 |
| JP | 10-143414 | 5/1998 |
| JP | 10-149432 | 6/1998 |
| JP | 10-275222 | 10/1998 |
| JP | 11-120180 | 4/1999 |
| JP | 11-195028 | 7/1999 |
| JP | 11-212988 | 8/1999 |
| JP | 2000-099540 | 4/2000 |
| JP | 2000-250942 | 9/2000 |
| JP | 2000-293281 | 10/2000 |
| JP | 2000-348040 | 12/2000 |
| JP | 2001-005822 | 1/2001 |
| JP | 2001-092737 | 4/2001 |
| JP | 2001-101227 | 4/2001 |
| JP | 2001-167288 | 6/2001 |
| JP | 2001-243244 | 9/2001 |
| JP | 2001-282816 | 10/2001 |
| JP | 2001-331514 | 11/2001 |
| JP | 2001-337762 | 12/2001 |
| JP | 2001-337953 | 12/2001 |
| JP | 2002-056411 | 2/2002 |
| WO | WO 00/65429 | 11/2000 |
| WO | WO 01/22194 | 3/2001 |
| WO | WO 01/63378 | 8/2001 |
| WO | WO 01/98881 | 12/2001 |
| WO | WO 03/001345 | 1/2003 |
| WO | WO 03/032199 | 4/2003 |
| WO | WO 2005/045756 | 5/2005 |
| WO | WO 2005/083595 | 9/2005 |
| WO | WO 2007/095997 | 8/2007 |
| WO | WO 2008/030779 | 3/2008 |

* cited by examiner

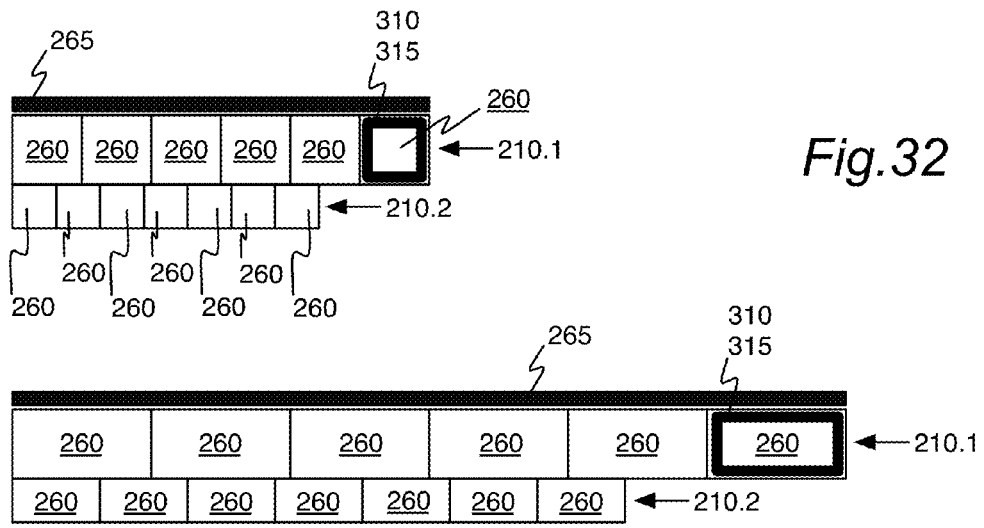
Fig.32
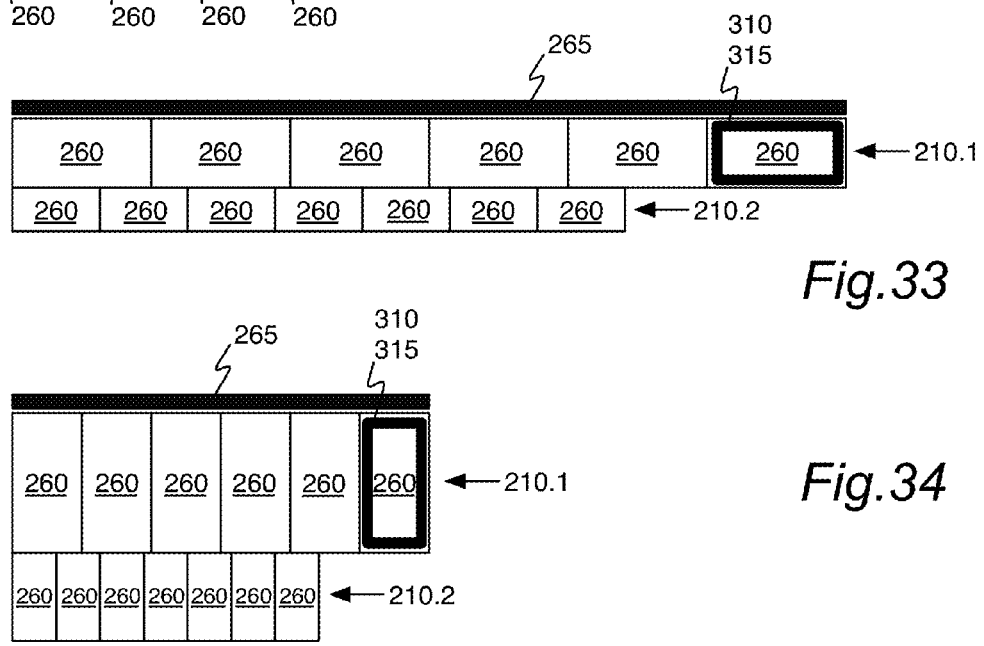
Fig.33
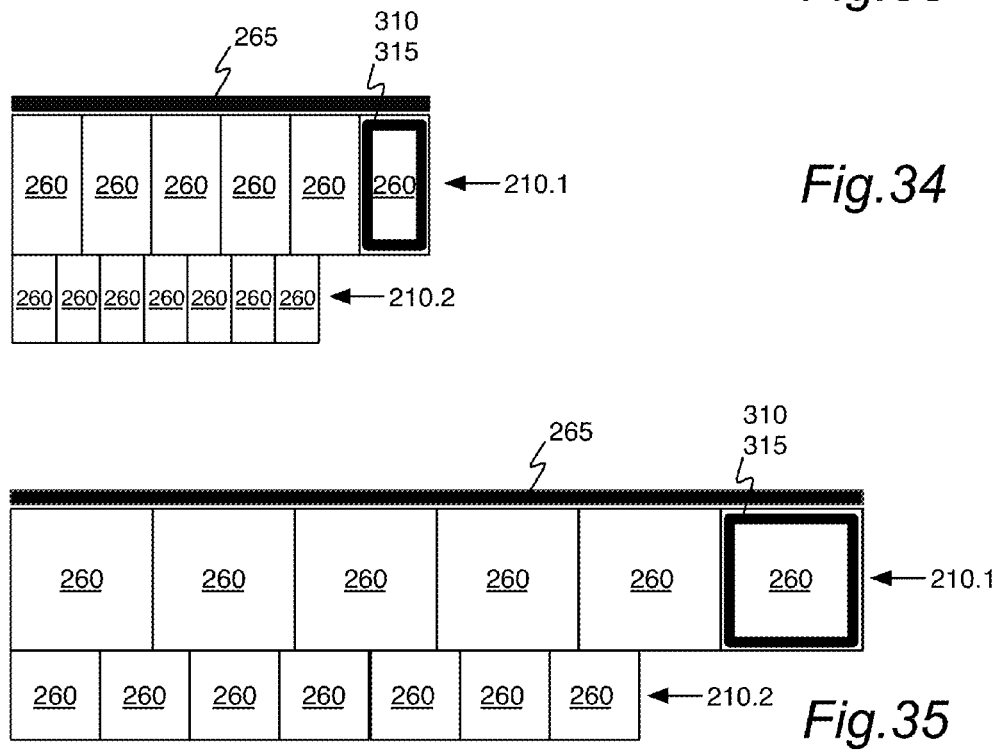
Fig.34
Fig.35

NON-HOMOGENEOUS OBJECTS MAGNIFICATION AND REDUCTION

CROSS-REFERENCES

The present invention relates to and claims priority from U.S. Provisional patent application No. 61/438,609, filed on Feb. 1, 2011, entitled ACTIVE AND SELECTED DOCUMENTS ON AXES THEREOF; EXPANDABLE AND COLLAPSIBLE AXES OF DOCUMENTS; NON-HOMOGENEOUS OBJECTS MAGNIFICATION AND REDUCTION, which is incorporated herein by reference.

FIELD OF THE INVENTION

This invention relates generally to computer systems and more specifically to a method, a system and an interface that facilitates the magnification and the reduction of objects on a display. More precisely, the present invention relates to a method of non-homogenously magnifying and reducing layouts of elements, objects and/or documents.

BACKGROUND OF THE INVENTION

Computers can come with a variety of display sizes. Desktop computers are adapted to be connected to large screen while mobile computers are required to deal with much smaller displays.

Magnifying information elements on a display generally requires magnification and reduction of the subject object displayed to maximize the use of the display area. Magnifying and reducing objects on a display equally magnifies intervening between-objects portions that do not need to be magnified because they do not add more meaning to the subject objects. Magnifying intervening between-objects portions use more display area that could be used more usefully by other objects.

Layout of objects can vary in accordance with a variety of possible uses. A problem arises with webpages, especially when seen on small screens like PDA's or mobile phones, which need to be magnified. Magnification of a webpage can be required for, for instance, becoming readable. Under some circumstances the magnification of the text is required for readability although the magnification of the margins around the text or enclosures in the text, like publicity or even images, might no be desirable considering the small size of the display area.

For instance, objects on a web page can include text and images that bring meaning to a reader. The text and the images are generally separated with margins thereof. Magnifying, for instance, a virtual newspaper to read it with, illustratively, a mobile phone, is going to also magnify the margins that are of no help for the reader since their smaller size, when they are not magnified, is sufficient to clearly distinguish the text from the images. In other words, their magnification is a non-optimal use of the display area that is available.

Similar principles can be applied to menu items using, for example, icons or the like in a predetermined graphical arrangements. Intervening margins between the menu items are magnified with the menu items and space is lost on the display area of the display while their enlargement (the margins) is of little help for the user since their smaller size was already sufficient to allow proper use of the menu items.

Today's information management systems are dealing with tremendous amounts of documents and other files. Files management systems are evolving toward a more graphical environment to facilitate document navigation and management. United States Patent Application Publication No.: US 2007/0214169 A1, published on Sep. 13, 2007 discloses a Multi-dimensional locating system and method (title). The patent application discloses ways for managing and displaying axes of documents and other computer-readable files. An axis of documents that groups a plurality of documents along a predetermined order, inter alia, is taught.

The use of only a small number of documents on a display might result in a poor use of the usable display area. A larger number of documents on an axis might be desirable. Similarly, a plurality of axes of documents might also be desirable to provide more information to a viewer. A number of challenges need to be addressed in order to provide some functions performed on a significant quantity of documents and/or a plurality of axes.

One of these challenges is to maximize the use of a display area when a number of documents on a single axis, or disposed on many axes displaying documents thereon, are simultaneously displayed. Magnifying (or reducing) the documents and/or the axes equally magnifies (or reduces) the margins around the documents and the axes. The magnification of the margins with the same magnification level for the documents and the axes might not be desirable. A small margin can be sufficient even with a strong magnification. The magnification of margins proportionally increases the non-useful area on the display.

In view of the prior art it appears that improvements over the prior art is desirable to improve the user experience and usability either with innovative graphical, structural or functional improvements.

SUMMARY OF THE INVENTION

The following presents a simplified summary of the invention in order to provide a basic understanding of some aspects of the invention. This summary is not an extensive overview of the invention. It is not intended to identify key/critical elements of the invention or to delineate the scope of the invention. Its sole purpose is to present some concepts of the invention in a simplified form as a prelude to the more detailed description that is presented later.

This invention generally refers to juxtaposed objects and intervening spaces thereof that do not require a similar magnification and/or reduction when they their size is changed. This invention also refers to user-selectable elements that might represent computer-readable files like documents and multimedia assets. Information elements can alternatively be referred to as, user-selectable elements, menu elements, icons or thumbnails that are associated to an attribute, a category or a tag and arranged as explained below. In order to lighten the reading of the present specification, the term "document" is generally used without intending to limit the scope of the present patent application only to documents, unless expressly specified.

Also, the invention is generally described using an assembly of documents called an axis of documents. The axis of documents generally refers to, but is not limited to, a comprehensive graphical layout of documents. Hereinbelow referred to as an axis that is embodied as a substantially rectilinear arrangement of documents. The axis might not necessarily be straight but preferably has a consistent shape providing a viewer an indication of continuity therebetween documents disposed thereon. In other words, the axis of documents can be defined by a single axis, a double axis of documents, or more adjacent axes of documents. The axis can be completely straight, slightly curved, substantially curved, angled, following a particular shape or having a consistent shape over which documents are disposed in a reasonably consistent fashion adapted to allow a viewer to infer a comprehensive suite of documents. The axes presented in the embodiments below are illustrated in the horizontal position while they could be disposed vertically without departing from the scope of the present disclosure.

An embodiment referred to below provides one or more groups of axes comprising documents thereon. Each axis of documents is preferably rectilinear to easily be located adjacent with other axes of documents to efficiently use the useful display area of the display. A system adapted to carry on the embodiments, a user graphical interface adapted to display the embodiments, a method adapted to provides the steps required to enable the embodiments and a medium storing instructions enabling the method once read by a machine are all considered within the scope of the present invention.

The present patent specification refers most of the time to a magnification function and a reduction function to lighten readability of the text. Whenever the function magnification is referred to alone, it also implicitly refers to its opposite and complementary function: the reduction.

An embodiment referred to below provides a means for magnifying and/or reducing meaningful objects on a display without magnifying and/or reducing intervening spaces and unmeaningful objects on a display to maximize the use of the useful viewing area of the display in at least an embodiment of the present invention.

An embodiment referred to below provides at least a mechanism, a method, an apparatus, a system and/or a graphical user interface adapted to non-homogeneously magnify and/or reduce a visible area of a display in at least an embodiment of the present invention.

An embodiment referred to below provides a mechanism configured to magnify and/or reduce some displayed objects while not magnify and/or reduce some other simultaneously displayed objects in at least an embodiment of the present invention.

An embodiment referred to below provides a method of determining which objects on a display are adapted to be magnified and/or reduced and which objects, intervening spaces and/or margins are not adapted to be magnified and/or reduced in at least an embodiment of the present invention.

An embodiment referred to below provides a method of grouping objects adapted to be displayed on a display that are adapted to be magnified and/or reduced and objects, intervening spaces and/or margins are not adapted to be magnified and/or reduced, to be used by a computer system to batch manage magnification and/or reduction of objects in at least an embodiment of the present invention.

An embodiment referred to below provides a mechanism configured to magnify and/or reduce some displayed objects at a defined rate while not magnify and/or reduce some other simultaneously displayed objects at the same rate; the magnify and/or reduce rates being linear or non-linear in at least an embodiment of the present invention.

An embodiment referred to below provides a method, a system and a graphical user interface configured to magnify and/or reduce only specific objects among a larger group of objects in at least an embodiment of the present invention.

An embodiment referred to below provides a magnification and/or reduction of one of many objects without magnification and/or reducing environment structures in at least an embodiment of the present invention.

An embodiment referred to below provides a method of magnification and/or reducing a layout of objects by magnifying the objects at a first magnifying rate and the surrounding environment at a second magnifying rate in at least an embodiment of the present invention.

An embodiment referred to below provides a first object magnification and/or reduction rate between a first size and a second size, and a second object magnification and/or reduction rate between the second size and a third size and also a first margin magnification and/or reduction rate between a first size and a second size and a second magnification and/or reduction rate between the second size and a third size in at least an embodiment of the present invention.

An embodiment referred to below provides a magnification and/or reduction anchor adapted to set the position of a layout of objects that is going to remain at the same place on a display during magnification and/or reduction in at least an embodiment of the present invention.

An embodiment referred to below provides a method of magnifying and or reducing documents in a layout of documents defining borders and margins by magnifying and/or reducing the documents and not magnifying and/or reducing the surrounding environment, the borders and/or the margins in at least an embodiment of the present invention.

An embodiment referred to below provides a method of magnifying documents in a layout of documents defining borders and margins by magnifying the documents and not magnifying the borders and the margins in at least an embodiment of the present invention.

An embodiment referred to below provides a product comprising a machine-readable medium; and machine-executable instructions for causing a computer to perform a method comprising providing a first object and a second object at least partially graphically circumventing the first object, the first object and the second object being adapted to be simultaneously displayed on a display area of a display; non-homogeneously changing a size of the two objects.

An embodiment referred to below provides a method of magnifying an array of information elements on a display, the method comprising displaying a plurality of information elements on the display with a size thereof, at least some of the plurality of information elements being surrounded by a margin thereof, and modifying the size of the plurality of displayed information elements on a basis of a first magnitude, at least a portion of the margins being adapted to change size on a basis of a second magnitude thereof.

An embodiment referred to below provides a method of non-homogeneously magnifying objects on a display, the method comprising providing an information element adapted to be displayed on a display and surrounded by a margin thereof; displaying the information element and its margin on a display; defining a standardized object adapted to respectively include therein the information element and at least a portion of the margin; magnifying the standardized object; defining a size of the magnified information element by removing an unmagnified size of the at least a portion of the margin to the size of the magnified standardized object; and displaying the magnified information element with its surrounding margin.

Other advantages might become apparent to the skilled reader of this patent specification in light of the text and appended drawings.

BRIEF DESCRIPTION OF THE DRAWINGS

FIG. 32 is an illustrative schematic view of a group of axes of square documents in accordance with an embodiment of the present invention;

FIG. 33 is an illustrative schematic view of a group of axes of rectangular documents in accordance with an embodiment of the present invention;

FIG. 34 is an illustrative schematic view of a group of axes of rectangular documents in accordance with an embodiment of the present invention;

FIG. 35 is an illustrative schematic view of a group of axes of square documents in accordance with an embodiment of the present invention;

DESCRIPTION OF EMBODIMENT(S) OF THE INVENTION

Figure 1:
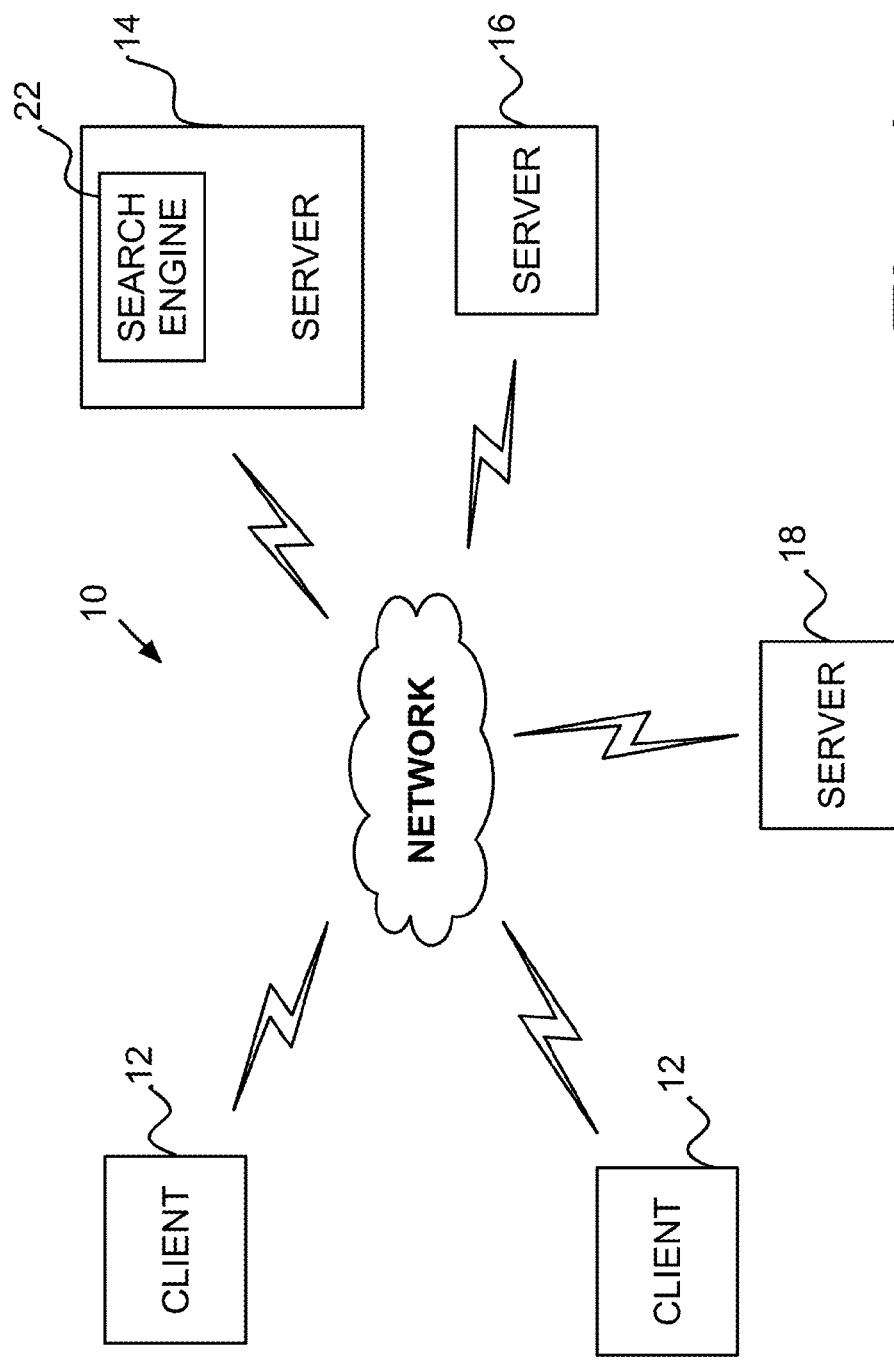
FIG. 1 is a schematic illustration of an exemplary computerized network.

The present invention is now described with reference to the drawings, wherein like reference numerals are used to refer to like elements throughout. In the following description, for purposes of explanation, numerous specific details are set forth in order to provide a thorough understanding of the present invention. It may be evident, however, that the present invention may be practiced without these specific details. In other instances, well-known structures and devices are shown in block diagram form in order to facilitate describing the present invention.

The description is separated with subtitles to facilitate its readability. The subtitles include descriptions of portions of invention that might be interrelated despite they might appear under different subtitles. In other words, subtitles are not intended to separate part of the same invention or different inventions described therein but are rather intended to structure the text.

The features provided in this specification mainly relates to basic principles for managing axes of documents. These code/instructions are preferably stored on a machine-readable medium adapted to be read and acted upon to with a computer or a machine having corresponding code/instructions reading capability.

Exemplary Network

FIG. 1 illustrates an exemplary network 10 in which a system and method, consistent with the present invention, may be implemented. The network 10 may include multiple client devices 12 connected to multiple servers 14, 16, 18 via a network 20. The network 20 may include a local area network (LAN), a wide area network (WAN), a telephone network, such as the Public Switched Telephone Network (PSTN), an intranet, the Internet, Wi-Fi, WiMAX or a combination of networks. Two client devices 12 and three servers 14, 16, 18 have been illustrated as connected to network 20 for simplicity. In practice, there may be more or less client devices and servers. Also, in some instances, a client device may perform the functions of a server and a server may perform the functions of a client device.

The client devices 12 may include devices, such as mainframes, minicomputers, personal computers, laptops, personal digital assistants, telephones, or the like, capable of connecting to the network 20. The client devices 12 may transmit data over the network 20 or receive data from the network 20 via a wired, wireless, or optical connection.

The servers 14, 16, 18 may include one or more types of computer systems, such as a mainframe, minicomputer, or personal computer, capable of connecting to the network 20 to enable servers 14, 16, 18 to communicate with the client devices 12. In alternative implementations, the servers 14, 16, 18 may include mechanisms for directly connecting to one or more client devices 12. The servers 14, 16, 18 may transmit data over network 14 or receive data from the network 20 via a wired, wireless, or optical connection.

In an implementation consistent with the present invention, the server 14 may include a search engine 22 usable by the client devices 12. The servers 14 may store documents, such as web pages, accessible by the client devices 12.

Figure 2:
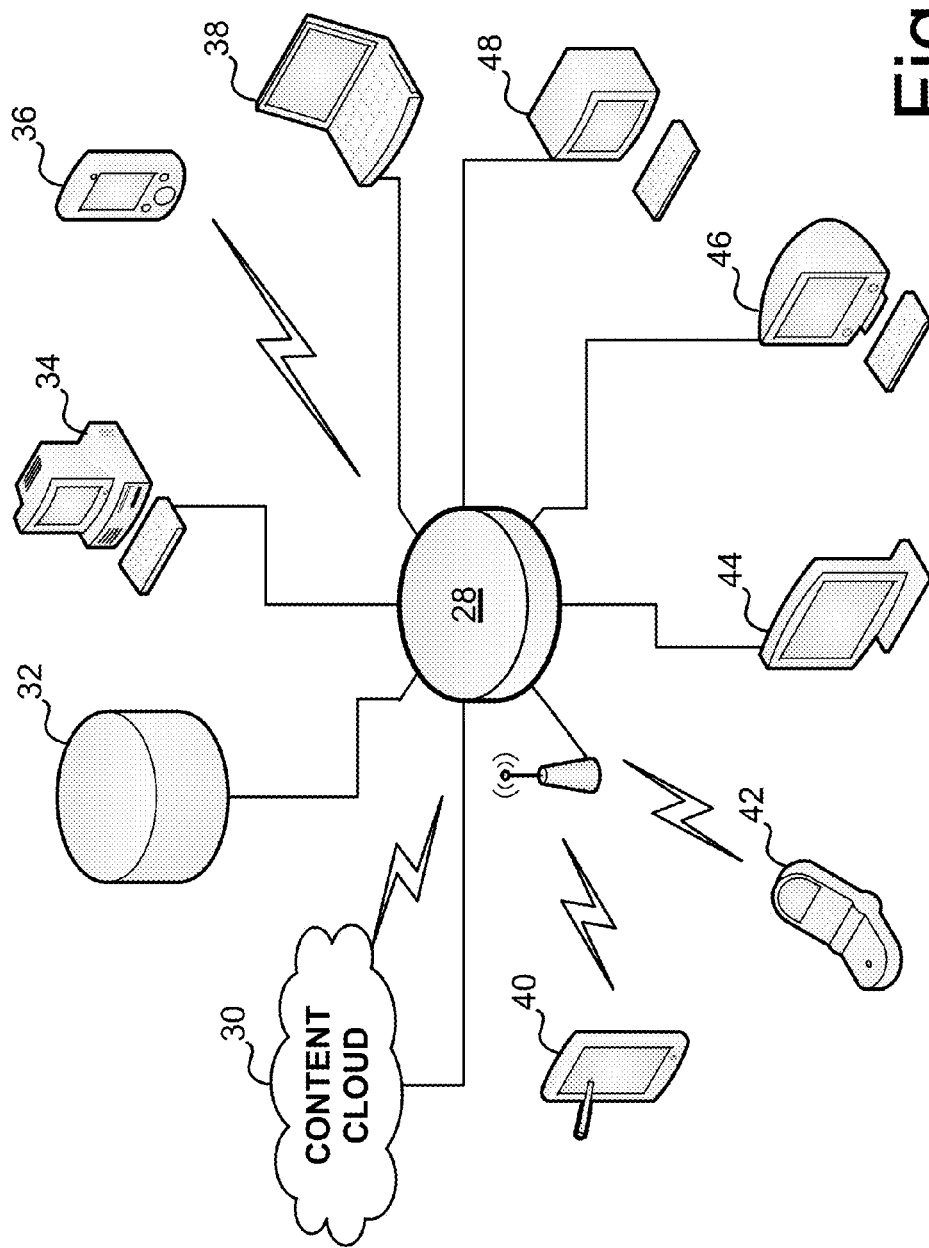
FIG. 2 is a schematic illustration of an exemplary multi-devices network layout.

With reference to FIG. 2, a network 20 includes the content cloud 30, a content database 32, content devices 34-38, and devices 40-48. The network mediator 28 enables the network devices 32-38 to communicate with each other without pre-configuring each device.

The content cloud 30 represent a content source such as the Internet, where content exists at various locations across the globe. The content includes multimedia content such as audio and video. The mediator 28 allows the content cloud to provide content to devices 40-48.

The content database 32 is a storage device that maintains content. The content database 32 may be a stand-alone device on an external communication network. The mediator 28 communicates with the content database 32 to access and retrieve content.

The content devices 34-38 include intelligent devices, such as, for example, personal computers, laptops, cell phones and personal digital assistants. The content devices 32-38 are capable or storing content information.

The devices 40-48 are intelligent devices that receive content from a content source 30-38. However, the devices 30-38 can also operate as servers to distribute content to other client devices.

Exemplary Client Architecture

Figure 3:
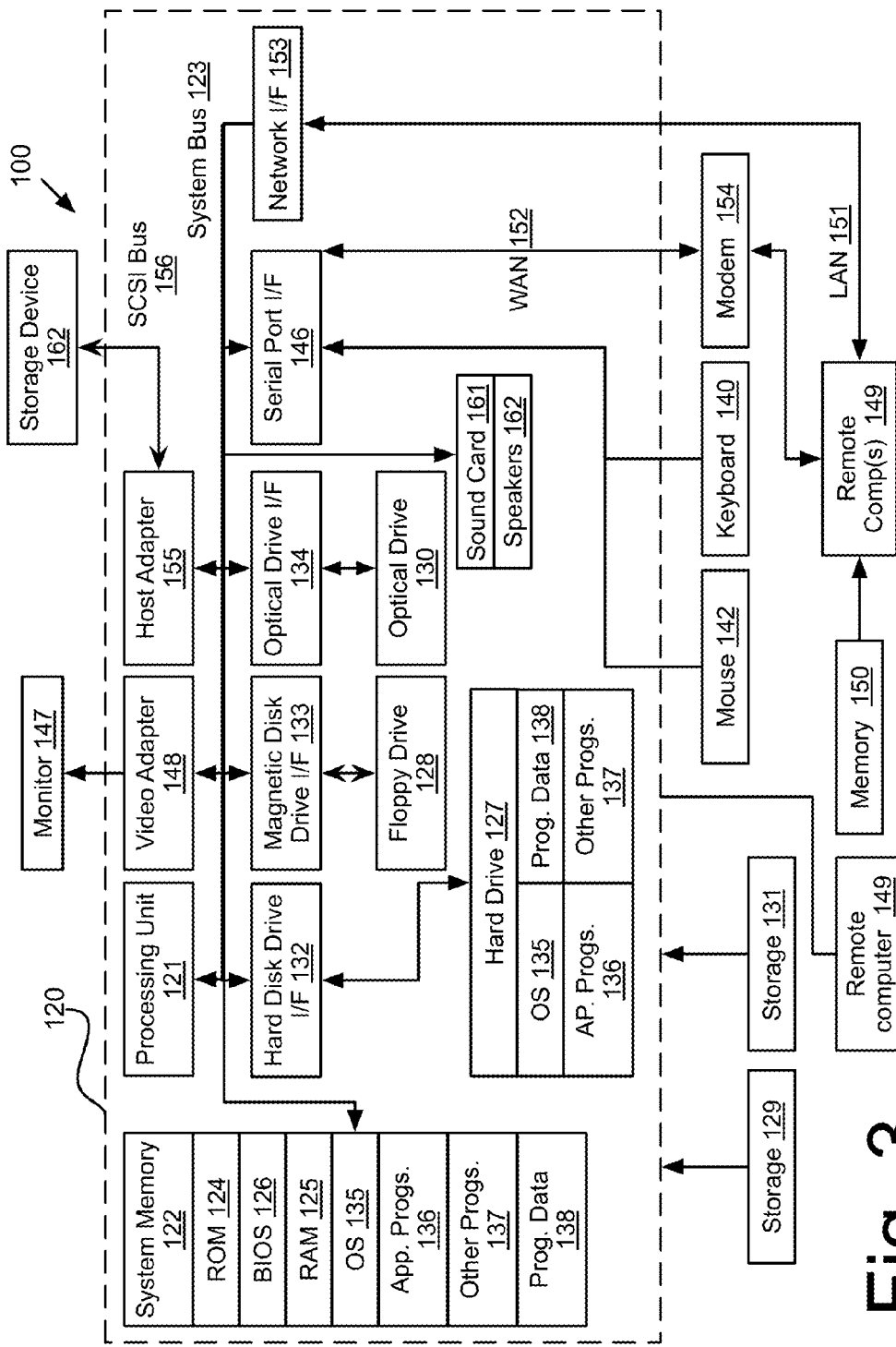
FIG. 3 is a schematic illustration of a typical exemplary computer system.

FIG. 3 and the following discussion provide a brief, general description of an exemplary apparatus in which at least some aspects of the present invention may be implemented. The present invention will be described in the general context of computer-executable instructions, such as program modules, being executed by a personal computer. However, the methods of the present invention may be effected by other apparatus. Program modules may include routines, programs, objects, components, data structures, applets, WEB 2.0 type of evolved networked centered applications, etc. that perform a task(s) or implement particular abstract data types. Moreover, those skilled in the art will appreciate that at least some aspects of the present invention may be practiced with other configurations, including hand-held devices, multiprocessor systems, microprocessor-based or programmable consumer electronics, network computers, minicomputers, set top boxes, mainframe computers, gaming console and the like. At least some aspects of the present invention may also be practiced in distributed computing environments where tasks are performed by remote processing devices linked through a communications network. In a distributed computing environment, program modules may be located in local and/or remote memory storage devices.

Now, with reference to FIG. 3, an exemplary apparatus 100 for implementing at least some aspects of the present invention includes a general purpose computing device in the form of a conventional personal computer 120. The personal computer 120 may include a processing unit 121, a system memory 122, and a system bus 123 that couples various system components, including the system memory 122, to the processing unit 121. The system bus 123 may be any of several types of bus structures including a memory bus or memory controller, a peripheral bus, and a local bus using any of a variety of bus architectures. The system memory may include read only memory (ROM) 124 and/or random access memory (RAM) 125. A basic input/output system 126 (BIOS), containing basic routines that help to transfer information between elements within the personal computer 120, such as during start-up, may be stored in ROM 124. The personal computer 120 may also include a hard disk drive 127 for reading from and writing to a hard disk, (not shown), a magnetic disk drive 128 for reading from or writing to a (e.g., removable) magnetic disk 129, and an optical disk drive 130 for reading from or writing to a removable (magneto) optical disk 131 such as a compact disk or other (magneto) optical media. The hard disk drive 127, magnetic disk drive 128, and (magneto) optical disk drive 130 may be coupled with the system bus 123 by a hard disk drive interface 132, a magnetic disk drive interface 133, and a (magneto) optical drive interface 134, respectively. The drives and their associated storage media provide nonvolatile (or persistent) storage of machine-readable instructions, data structures, program modules and other data for the personal computer 120. Although the exemplary environment described herein employs a hard disk, a removable magnetic disk 129 and a removable optical disk 131, those skilled in the art will appreciate that other types of storage media, such as magnetic cassettes, flash memory cards, digital video disks, Bernoulli cartridges, random access memories (RAMs), read only memories (ROM), and the like, may be used instead of, or in addition to, the storage devices introduced above.

A number of program modules may be stored on the hard disk 127, magnetic disk 129, (magneto) optical disk 131, ROM 124 or RAM 125, such as an operating system 135 (for example, Windows® NT® 4.0, sold by Microsoft® Corporation of Redmond, Wash.), one or more application programs 136, other program modules 137 (such as "Alice", which is a research system developed by the User Interface Group at Carnegie Mellon University available at www.Alice.org, OpenGL from Silicon Graphics Inc. of Mountain View Calif., or Direct 3D from Microsoft Corp. of Bellevue Wash.), and/or program data 138 for example.

A user may enter commands and information into the personal computer 120 through input devices, such as a keyboard 140, a camera 141 and pointing device 142 for example. Other input devices (not shown) such as a microphone, joystick, game pad, satellite dish, scanner, a touch sensitive screen, accelerometers adapted to sense movements of the user or movements of a device, or the like may also be included. These and other input devices are often connected to the processing unit 121 through a serial port interface 146 coupled to the system bus. However, input devices may be connected by other interfaces, such as a parallel port, a game port, blue tooth connection or a universal serial bus (USB). For example, since the bandwidth of the camera 141 may be too great for the serial port, the video camera 141 may be coupled with the system bus 123 via a video capture card (not shown). The video monitor 147 or other type of display device may also be connected to the system bus 123 via an interface, such as a video adapter 148 for example. The video adapter 148 may include a graphics accelerator. One or more speaker 162 may be connected to the system bus 123 via a sound card 161 (e.g., a wave table synthesizer such as product number AWE64 Gold Card from Creative® Labs of Milpitas, Calif.). In addition to the monitor 147 and speaker(s) 162, the personal computer 120 may include other peripheral output devices (not shown), such as a printer for example. As an alternative or an addition to the video monitor 147, a stereo video output device, such as a head mounted display or LCD shutter glasses for example, could be used.

The personal computer 120 may operate in a networked environment that defines logical connections to one or more remote computers, such as a remote computer 149. The remote computer 149 may be another personal computer, a server, a router, a network PC, a peer device or other common network node, and may include many or all of the elements described above relative to the personal computer 120, although only a memory storage device has been illustrated in FIG. 1. The logical connections depicted in FIG. 2 include a local area network (LAN) 14 and a wide area network (WAN) 152, an intranet and the Internet.

When used in a LAN, the personal computer 120 may be connected to the LAN 14 through a network interface adapter (or "NIC") 153. When used in a WAN, such as the Internet, the personal computer 120 may include a modem 154 or other means for establishing communications over the wide area network 152 (e.g. Wi-Fi, WiMax . . . ). The modem 154, which may be internal or external, may be connected to the system bus 123 via the serial port interface 146. In a networked environment, at least some of the program modules depicted relative to the personal computer 120 may be stored in the remote memory storage device. The network connections shown are exemplary and other means of establishing a communications link between the computers may be used.

The Interface

An interface program providing an interface for managing documents in accordance with an embodiment of the invention is installed on a machine e.g. a computer system. The interface can be programmed using various programming languages e.g. C++, Java or other suitable programming languages. Programming of these languages is well known in the art and is adapted to be readable to provide executable instructions to a hardware system and will not be further described therein. The interface might run through the operating system and the hardware of the computer system or, alternatively, through a network based system e.g. client-server, and/cloud computing system. The interface is adapted to manage documents, computer files, pictures, multimedia content, applications (i.e. computer programs), menu elements, sets of icons and other user-selectable elements in a comprehensive fashion.

Several embodiments follows: Documents are stored on a machine-readable medium and can be retrieved on demand when needed with the interface program. Documents are disposed in an axis-like layout providing a visually comprehensive display arrangement of the documents. The axis can, illustratively, among other possibilities, be based on a selection of attribute(s), tag(s), category(ies), owner of documents, a chronological order, a statistical order or an order representing an increasing file size. Combinations of the above-listed possible choices, inter alia, are possible if desired to build a query adapted to reduce the number of documents to be displayed on the axis. The axis thus helps the viewer to infer additional meaning from the comprehensive layout, consistent display and distribution of the documents thereon.

An axis is adapted to accommodate a single type of documents or, if desired, more than one type of documents, and/or a mix of documents, computer files, multimedia contents and/or user-selectable menu elements. Documents might overlap to squeeze more documents on the space available on the display. Magnification of selected documents on an axis can be made to increase the level of details of the selected documents.

Using an axis of documents helps to meaningfully and intuitively display a group of documents. An axis of documents can be embodied as being a substantially linear distribution of documents adapted to dispose each document to be displayed on a line or on a curved line. A curved or a circular axis of documents is also contemplated to be within the scope of the present disclosure. The exact shape of the axis is secondary, what matters, inter alia, is that the layout structure of an axis provides a comprehensive suite of documents from which a viewer can infer an order, a sequence or a relationship between documents. The display of the axis of documents might be made in accordance with a predetermined order (e.g. chronologically), or not. A chronological distribution of documents can sort documents on a timeline. The chronological order can either be linear or non-linear; meaning that a unit of time has always the same graphical length on the display in the linear configuration. The non-linear configuration might non-evenly display similar units of time because the distribution of documents along the timeline prevails over the linearity of time. Another illustrative embodiment is a group of juxtaposed axes of documents grouped together to form an axis of documents referring to a matrix of documents.

The display of documents on an axis of documents allows to contextually manage documents as a flow, or an ongoing suite, of documents instead of dealing with each document independently. By getting away from managing each document independently it becomes possible to efficiently deal with a significantly higher number of documents and still keep the documents in a structured order.

Each axis of documents groups documents in accordance with, for example, a selected tag, a category, keywords, or an attribute that is commonly shared among the documents displayed on the axis of documents. The term "attribute" will consistently be used throughout the instant specification to lighten the reading of the text and will include the other commonality between documents described therein unless otherwise specified. The selection of one or more attribute (using Boolean logic for instant) determines which documents will be displayed on the axis of documents. If no specific attribute is selected, then, the axis of documents displays all documents. Thus, all documents on the same axis of documents are normally associated with the selected set or combination of attributes (trivial data, like publicity or specific related information, could be added to an axis as long as the outcome remains a presentation of documents resulting from a query without departing from the scope of the present invention). In addition, a timeline can be used to determine the order of the suite of documents on the axis of documents. Chronological ordering is a very intuitive ordering to humans and is one of the preferred ways to present documents on an axis of documents. In the case of a matrix of documents, then, one axis (e.g. horizontal direction) of the matrix can represent a timeline while the other axis (e.g. vertical direction, orthogonal, . . . ) represents another criterion like, for example, the type of computer files each document relates to. The other axis can also use a timeline if desirable.

The attributes of a document can be selected to create another axis of documents. The attribute of a document from the newly created axis of documents can be selected to create an additional axis of documents and so on so forth. This is what could be called "relational navigation" and is well described in the United States patent application publication referred to at the beginning of the present patent specification. Hence, the user can "navigate" along axes of documents in accordance with their categorization to visualize the documents. Navigation tools are provided with the interface to allow navigation through various axes of documents, when a plurality of axes is enabled, and through the documents of a single axis of documents. In the context of the present invention, a single suite of documents forming an axis along a timeline is one of the preferred embodiments because it is easy to sequentially navigate throughout the documents disposed along the axis. Other graphical layouts of documents might become obvious for a skilled reader in light of the present application and would be considered within the scope of this application.

When only a portion of the axis is visible, a play of zoom, pan and movements along the axis allows a viewer to navigate on the axis and change the document(s) that is(are) displayed on the display. A small display area could display only one document from the axis of documents while the remaining documents from the axis of documents are not displayed but remain nonetheless at their respective "virtual" position on the axis and ready to be displayed if the axis is scrolled to show other documents. In other words, if we consider a mobile platform like a mobile phone having a small display, the small display area might allow to efficiently display only one document at the time. However, the displayed document being part of an axis of documents, the other documents on the axis of documents remain displayable in accordance with their respective position on the axis of documents when the axis is scrolled/navigated/gestured.

Figure 4:
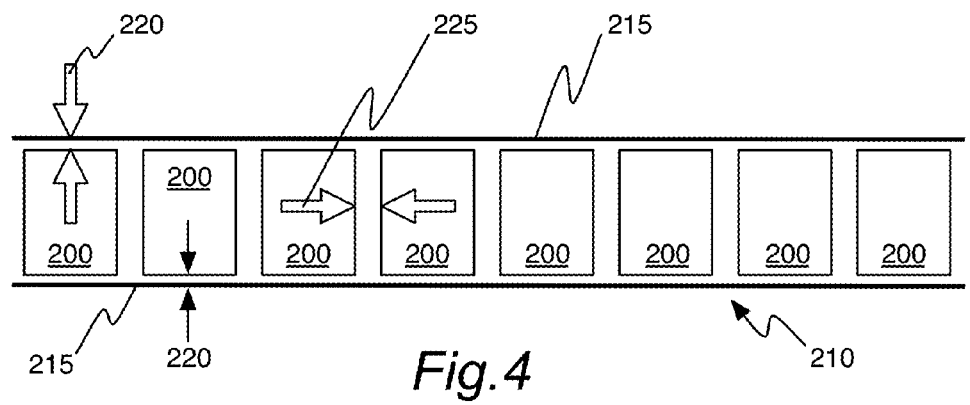
FIG. 4 is a schematic illustration of a prior art axis of documents in a longitudinal arrangements of documents.

Referring now to FIG. 4, it is possible to appreciate a plurality of documents 200 disposed on an axis of documents 210. Each document 200 is located on axis of documents 210 that is illustratively defined by borders or rails 215. The documents 200 are vertically located between rails 215 with a margin 220 above and another margin below. The documents 200 are separated apart from adjacent documents 200 with an intervening margin 225.

Figure 5:
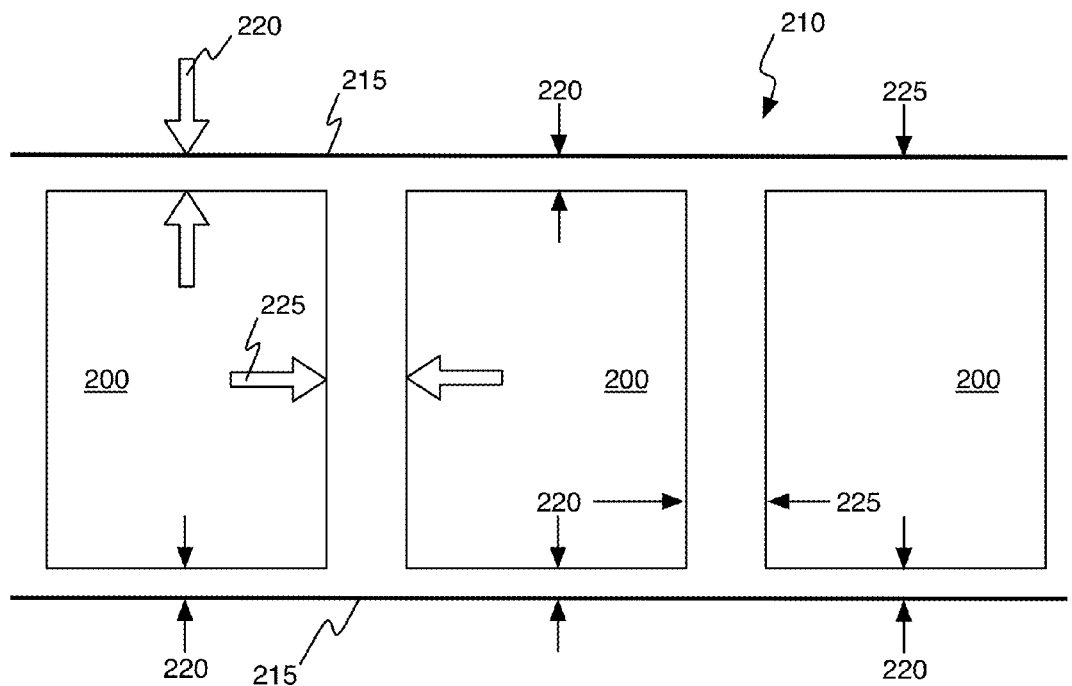
FIG. 5 is a schematic illustration of a magnified portion of the axis of documents of FIG. 4.

A magnification of the axis of documents 210 of FIG. 4 leads to a proportional magnification of all components (or objects). As illustrated in magnified FIG. 5, the documents 200 and the margins 220, 225 are bigger but all proportions have been kept unchanged from the original size illustrated in FIG. 4. One can appreciate that the documents 200 are larger and easier to read but the margins 220, 225 are also substantially larger and do not necessarily provide additional advantages to the viewer. In fact, in the case that the axis of documents 210 is displayed on a small display like a mobile phone, the expansion of the margins 220, 225 take some valuable viewing area from the display, which is mostly undesirable.

An embodiment of the present invention provides an improved way to magnify/reduce a layout of documents 200 (on an axis 215 or not) by setting the size of the margins 220, 225 such that they do not change in size with the documents 200 (or other objects).

An alternate embodiment suggests that the margins 220, 225 do not magnify and/or reduce proportionally with the magnification and/or reduction of the documents 200. For instance, the margins 220, 225 can remain fixed for a change in size of the documents when the documents are of significant sizes. However, when the documents are rather small and are further magnified, the impact of the magnified margins 220, 225 is more significant on the viewing area of the display. This is why one embodiment of the invention provides a non-linear relation between the magnification of the documents and the change in size of the margins 220, 225. The margins 220, 225 can remain fixed over a portion of the possible documents size variation while it changes over a different portion of the documents size variation. Preferably, as mentioned above, it might be desirable to change the proportions of the margins 220, 225 when the documents are very small.

Figure 6:
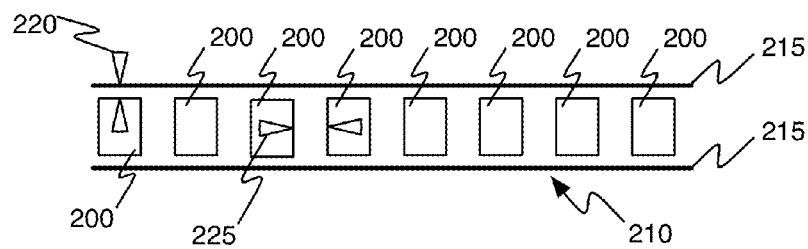
FIG. 6 is a schematic illustration of an axis of documents in a zoomed out configuration with fixed intervening portions in accordance with an embodiment of the present invention.
Figure 7:
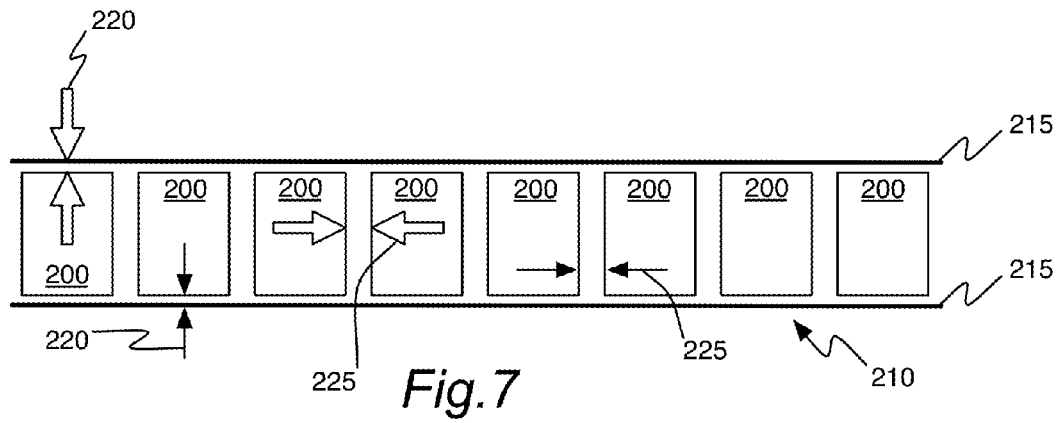
FIG. 7 is a schematic illustration of an axis of documents in a zoomed in configuration with fixed intervening portions in accordance with an embodiment of the present invention.
Figure 8:
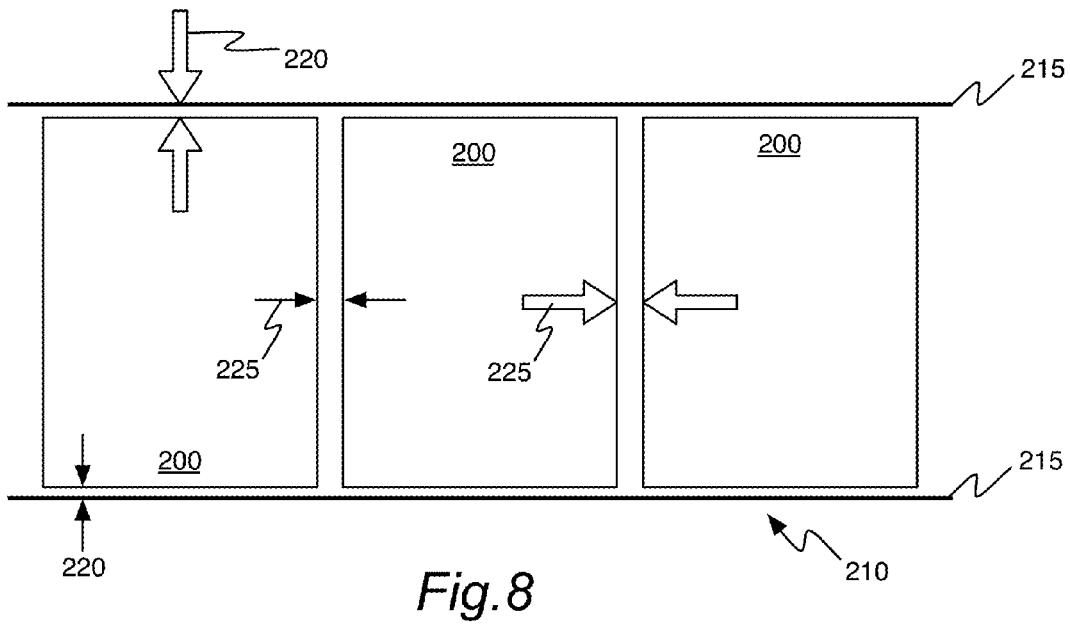
FIG. 8 is a schematic illustration of an axis of documents in a strong zoomed in configuration with fixed intervening portions in accordance with an embodiment of the present invention.

Referring to FIGS. 6 through 8, an axis of documents 210 is shown in three different sizes. However, this time, the margins 220, 225 remain fixed and are not magnified with the documents 200. It can be appreciated from FIGS. 6 through 8 the emphasis is put on the documents 200 while the margins 220, 225 remains as proper separations to help distinguish and graphically distance the documents 200 from one another. In this embodiment, the fact that the margins 220, 225 are not magnified does not harm the perception of separation between the documents 200 and the margins 220, 225 do not take unnecessary space on the useful viewing area of a display (the display is not illustrated on the Figures, it is assumed that a skilled reader in the art of document management systems and interfaces thereof is going to understand that the embodiments depicted in the Figures are intended to represent displayed objects on a display or a portion thereof without being confused).

Figure 9:
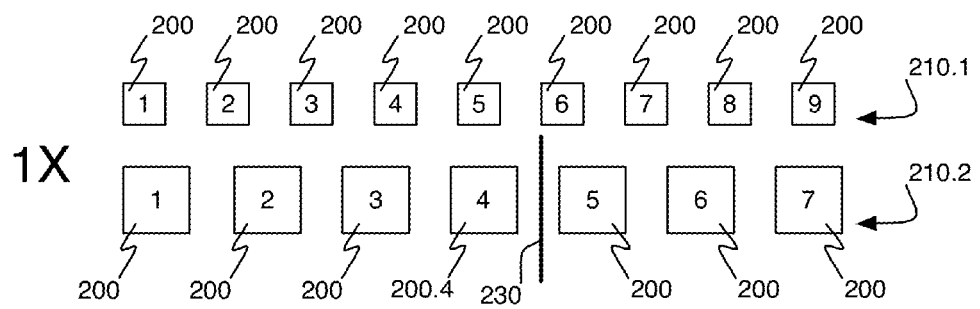
FIG. 9 is an illustrative schematic view of the relative position of schematic layout of documents in accordance with an embodiment of the present invention.
Figure 10:
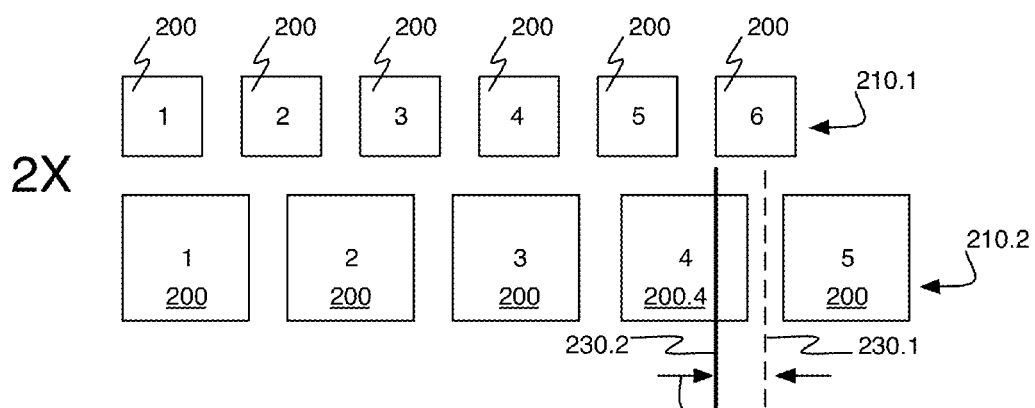
FIG. 10 is an illustrative schematic view of the relative position of a magnified schematic layout of documents in accordance with an embodiment of the present invention.

FIG. 9 and FIG. 10 illustrate two adjacent schematic axes of documents 210.1 and 210.2. Their respective relative positions are material for a user to obtain a consistent and comprehensive graphical representation thereof to ensure that a viewer would not be confused when they are both magnified. Now, lets take document 200.6 in axis of documents 210.1 in relation with document 200.4 in axis of documents 210.2 illustrated by line 230. It is clear that line 230 falls between document 200.4 and 200.5 of axis of documents 210.2 in FIG. 9. After a magnification doubling the sizes of documents from FIG. 9 to FIG. 10, while keeping margins thereof unmagnified, the same line 230, now identified as line 230.2 is drawn on document 200.4 from axis of documents 210.2. The difference between the position of line 230 before magnification, illustrated with dotted line 230.1 in FIG. 10, and the position of line 230, from FIG. 9, after magnification, now line 230.2, is illustrated with arrows 235.

This means that there is a relative longitudinal displacement between documents 200 disposed along two (or more) axes of documents 210 if the margins are not magnified linearly with the documents. In other words, if the complete image is not magnified as a whole, a misalignment is created between juxtaposed axes of documents 210 as it is exemplified in FIG. 9 and FIG. 10. A mathematical proof of this misalignment reads as follow in Equation 1: The two axes of documents 210.1, 210.2 are disposed next to each other with an intervening space of an arbitrary size. The first axis of documents 210.1 has five documents 200, when taken from the left, to line 230. A document 200 has, for example, a size of one (1) unit and intervening margins of a size of one (1) unit, the sum is 10, as seen in equation 1a). The second axis of document have four documents of a size of two (2) units and intervening margins of a size of one (1) unit, the sum is 10 as seen in equation 1b). These two axes of documents are well aligned. After magnification of the axes of documents 210 by a factor of two (2), as it is illustrated in FIG. 10, the sum of the first axis of documents 210.1 is 15, as depicted in equation 1c), and the second axis of documents has a sum of 16, as identified in equation 1d). The sums of the two magnified axes of documents 210.1 and 210.2 illustrated in FIG. 10 are not equal anymore as it was with the Equations 1a) and 1b) referring to FIG. 9. The difference in the sum is the discrepancy generated by the magnification. The two equations 1c) and 1d) should be equals if the magnification of juxtaposed axes of documents 210 could keep the same alignment.

a) 5·1+5=10 b) 4·1.5+4=10 c) 5·2+5=15 d) 4·3+4=16       Equation 1

Figure 11:
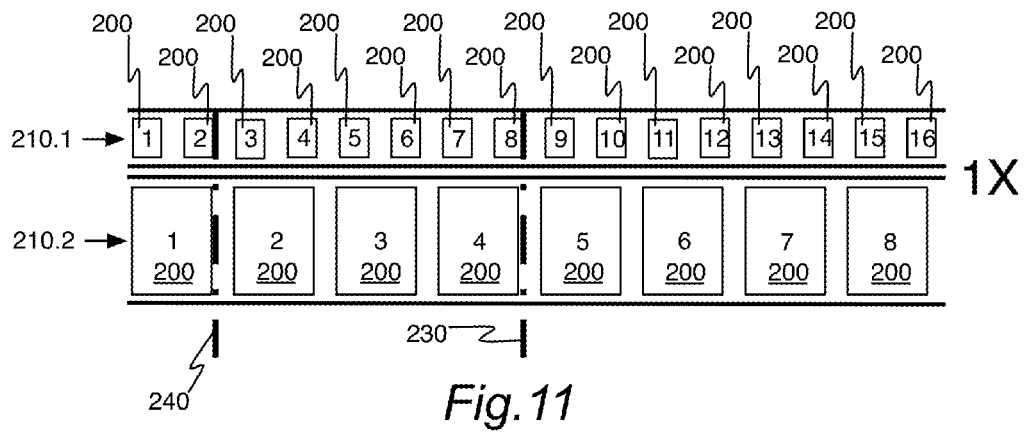
FIG. 11 is an illustrative schematic view of the relative position of schematic layout of documents in accordance with an embodiment of the present invention.
Figure 12:
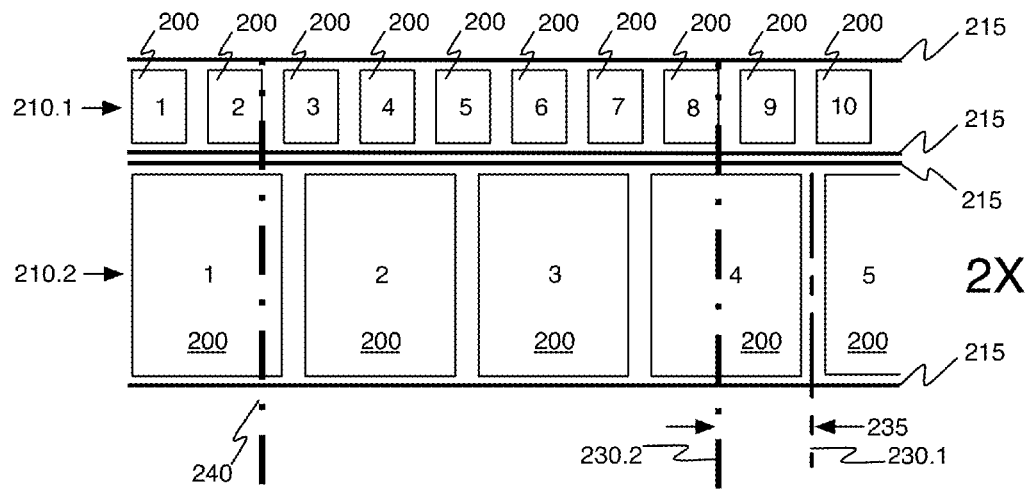
FIG. 12 is an illustrative schematic view of the relative position of a magnified schematic layout of documents in accordance with an embodiment of the present invention.

A similar example of misalignment is illustrated in FIG. 11 and FIG. 12 using axes of documents 210 and documents 200. Again, the difference between the position of line 230 before magnification, illustrated with dotted line 230.1, and the position of line 230 after a factor two (2) magnification with fixed margins, now line 230.2, is illustrated with arrow 235. One can appreciate that the difference is substantial. Another line 240 associated to document 200.2 from axis of documents 210.1 is illustrated in FIG. 11 and FIG. 12 to show that even after a short length on an axis of documents 210 (in the present situation after only two documents) there is a substantial difference between two juxtaposed axes of documents 210.1 and 210.2.

Figure 13:
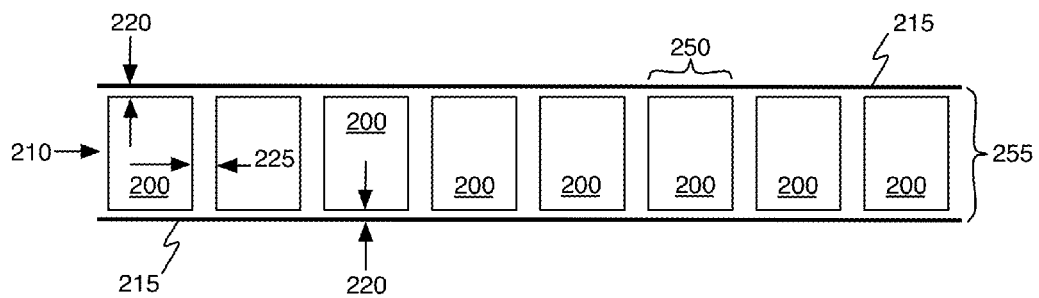
FIG. 13 is an illustrative schematic view of an axis of documents in accordance with an embodiment of the present invention.
Figure 14:
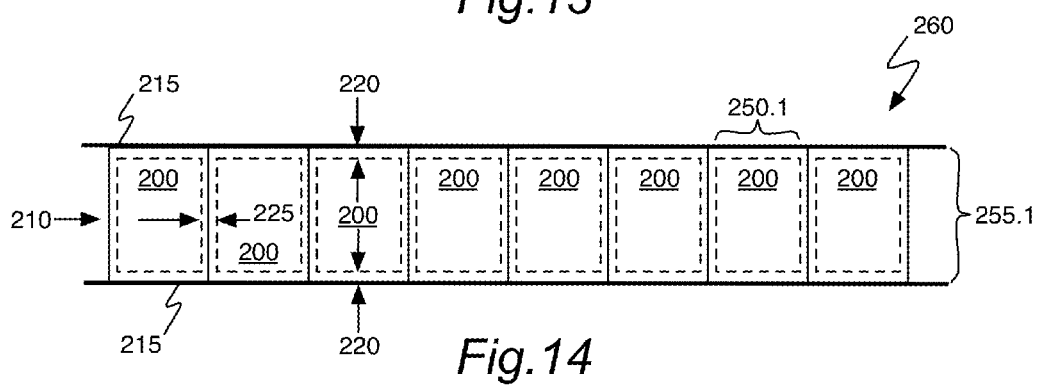
FIG. 14 is an illustrative schematic view of the intervening portions around each document in accordance with an embodiment of the present invention.
Figure 15:
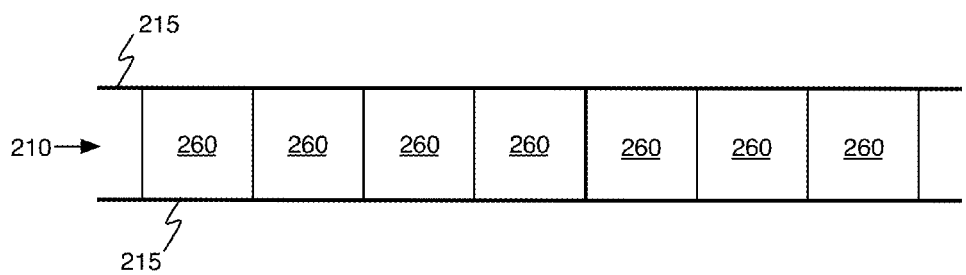
FIG. 15 is an illustrative schematic view of the axis of document and their intervening portions considered as a single object in accordance with an embodiment of the present invention.

Moving now to FIG. 13 that is virtually similar to FIG. 4 where the width 250 and the height 255 of each document 200 are magnified while the margins 220, 225 are kept constant, or fixed, and therefore not magnified. In contrast, as illustrated in FIG. 14, an embodiment of the present invention assembles the margins 220, 225 with their respective width 250 and the height 255 of the document 200 prior to magnification. It has to be noted that the horizontal margin 225 between two adjacent documents 200 is divided in two (2) and equally shared on both sides to form the margins on the adjacent sides of the two (2) adjacent documents 200. This way, both the document 200 and its surrounding margins 220, 225 are magnified together. The magnification and/or reduction therefore considers each document 200 and its surrounding margins 220, 225 as being a single object 260 as illustrated in FIG. 15. All the juxtaposed objects 260 on a plurality of axes of documents can be magnified/reduced without creating a difference as previously explained in respect with FIG. 11 and FIG. 12.

Figure 16:
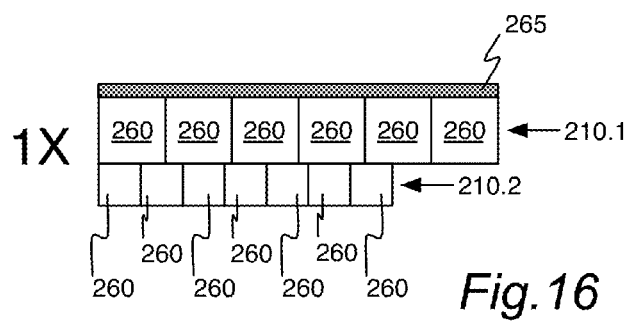
FIG. 16 is an illustrative schematic view of multiple axes of objects without intervening portions in accordance with an embodiment of the present invention.
Figure 17:
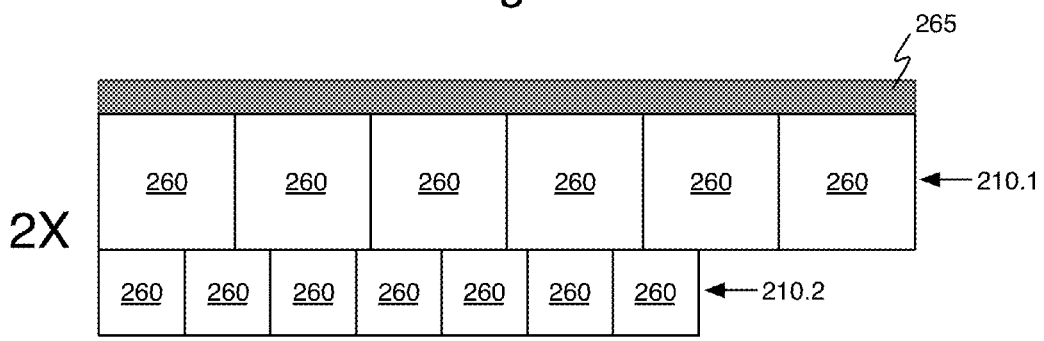
FIG. 17 is an illustrative schematic view of the magnification of multiple axes of objects without intervening portions in accordance with an embodiment of the present invention.
Figure 18:
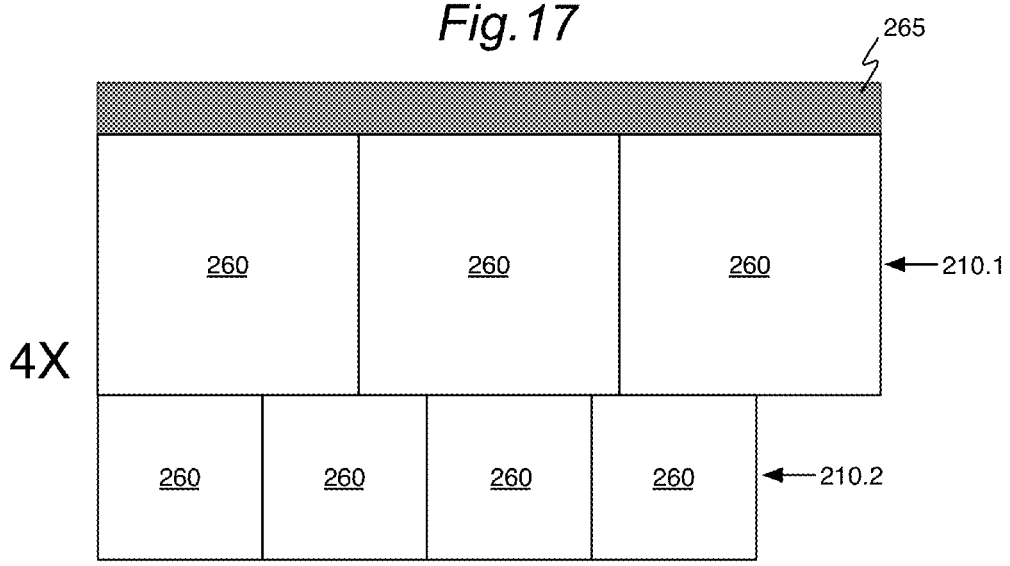
FIG. 18 is an illustrative schematic view of the magnification of multiple axes of objects without intervening portions in accordance with an embodiment of the present invention.

FIG. 16 illustrates two juxtaposed axes of documents 210.1 and 210.2 having a plurality of objects thereon. All the margins (visible in FIG. 13 with reference numbers 220, 225) are comprised in each object 260 with their respective document 200 (visible in FIG. 13). A magnification of the collection of objects 260 from FIG. 16 by a factor of two (2) gives the rendering of FIG. 17 where no discrepancies in object 260 respective positions have been created. Again, a magnification of the collection of objects 260 from FIG. 16 by a factor of four (4) gives the rendering of FIG. 18 where no differences in object 260 positions have occurred.

Once the magnification of the objects 260 has been made, the margins 220, 225 are extracted from the magnified object 260 as it is explained below. The general equation exemplified in Equation 2 stipulates that c is the total document size, $m_1$ is the size of one of the two margins and $m_2$ is the size of the other margin. Therefore, the size, in one direction, of an object is defined by Equation 2 that can also take into consideration intentional variation in margins sizes.

$$f(c) = c - m_1 - m_2 \qquad \text{Equation 2}$$

Figure 19:
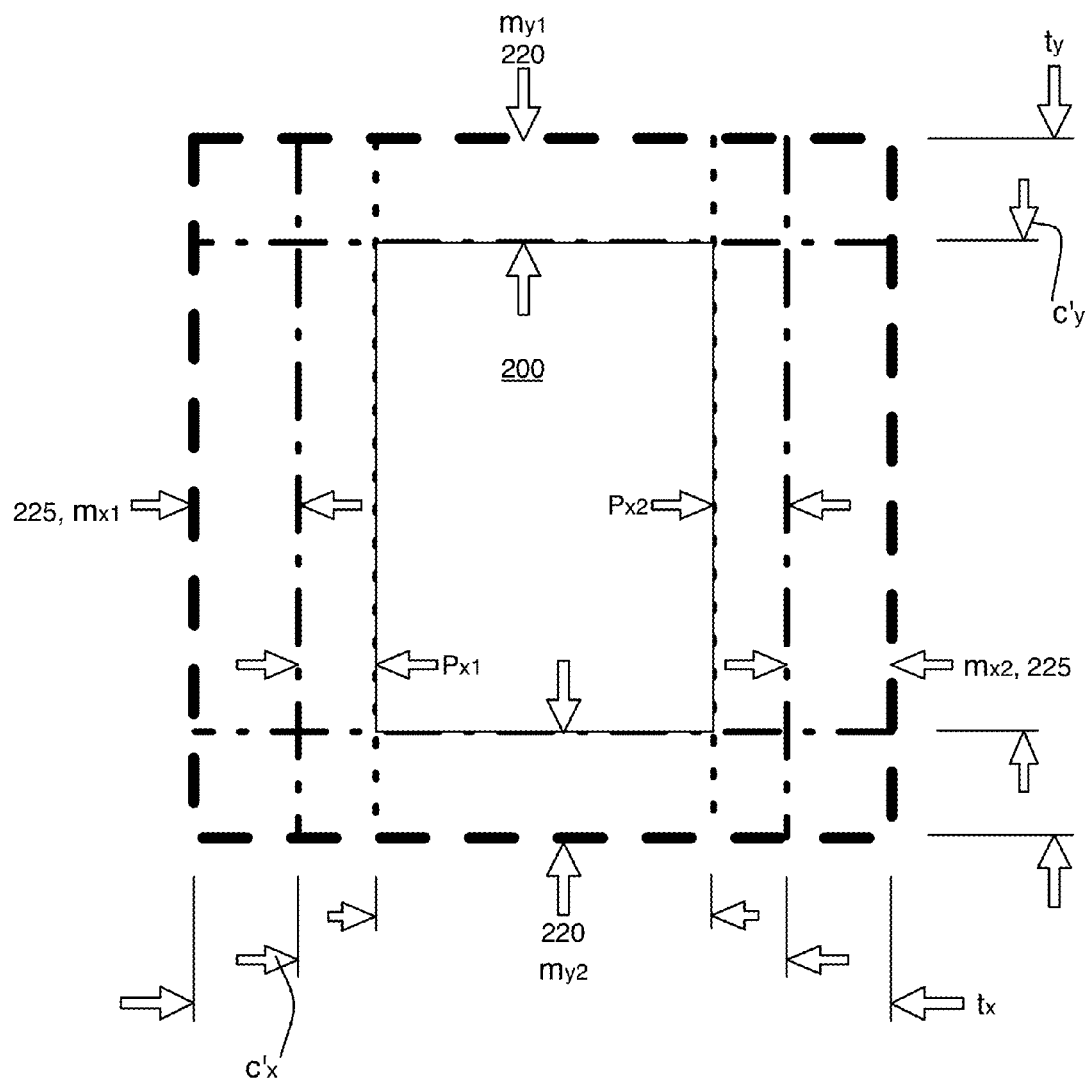
FIG. 19 is an illustrative schematic view of the representation of the different components of a document and its intervening portions as a object in accordance with the embodiment of the present invention.

The illustrative object 260 used in the present embodiment illustrated in FIG. 19 has a square or a rectangular shape. The general equation exemplified in Equation 2 can be adapted to calculate the size of the space within the margins in a magnified and/or reduced document—or any graphical object—260, by a factor $\alpha$, in the x direction and in the y direction, as exemplified in Equation 3. The space within the margin, delimited by arrows $s_x$ and $s_y$ in FIG. 19, is going to be referred as an internal space. The total document size, delimited by arrows $c_x$ and $c_y$, is going to be referred as an object container.

$$s_x = f(\alpha c_x) = \alpha c_x - m_{x1} - m_{x2}$$

$$s_y = f(\alpha c_y) = \alpha c_y - m_{y1} - m_{y2} \qquad \text{Equation 3}$$

FIG. 19 shows a document that has a different aspect ratio than the object container 260 discussed above. Let us consider the magnified and/or reduced document dimension $o'_x$ and $o'_y$ we are trying to calculate. For maximum use of the internal space, the object 200 is magnified vertically. The same magnification ratio is used horizontally to keep the image aspect ratio. The next equations could be reversed to accommodate a portrait-oriented document. The calculation of the final width of the magnified/reduced document is then calculated by keeping the ratio from the original dimension of the document $o_x$ and $o_y$.

$$\frac{o'_x}{o'_y} = \frac{o_x}{o_y}$$ Equation 4

$$o'_x = \frac{o_x o'_y}{o_y}$$

In Equation 5, A "padding" area, $p_{x1}$ and $p_{x2}$, is used to accommodate document 200 shape variations without effecting a "general" transformation process into an object 260. The formulas used to consider the padding area are expressed in Equation 4 that follows.

$$s_y = o'_y = \alpha c_y - m_{y1} - m_{y2}$$

$$s_x = o'_x + p_{x1} + p_{x2} = \alpha c_x - m_{x1} - m_{x2}$$

$$p_{x1} + p_{x2} = \alpha c_x - m_{x1} - m_{x2} - o'_x \quad \text{Equation 4}$$

We are trying to extract the new size of the padding $p_{x1}$ and $p_{x2}$. We first need to eliminate $o'_x$ by using the result of Equation 3, we get:

$$p_{x1} + p_{x2} = \alpha c_x - m_{x1} - m_{x2} - \frac{o_x o'_y}{o_y} \quad \text{Equation 5}$$

$$p_{x1} + p_{x2} = \alpha c_x - m_{x1} - m_{x2} - \frac{o_x(\alpha c_y - m_{y1} - m_{y2})}{o_y}$$

In the preferred embodiment of this invention, we center the document in the object space. To do that, we define the two padding as equals in Equation 6.

$$p_x = p_{x1} = p_{x2} \quad \text{Equation 6}$$

$$2p_x = \alpha c_x - m_{x1} - m_{x2} - \frac{o_x(\alpha c_y - m_{y1} - m_{y2})}{o_y}$$

$$p_x = \frac{1}{2}\left(\alpha c_x - m_{x1} - m_{x2} - \frac{o_x(\alpha c_y - m_{y1} - m_{y2})}{o_y}\right)$$

An alternate embodiment is that the left padding has a share $\beta$ and the right padding has share $1-\beta$, where $0 \leq \beta \leq 1$. This gives the result shown in Equation 7. This will keep proportions between left and right padding during magnification.

$$p_{x1} = \beta\left(\alpha c_x - m_{x1} - m_{x2} - \frac{o_x(\alpha c_y - m_{y1} - m_{y2})}{o_y}\right) \quad \text{Equation 7}$$

$$p_{x2} = (1-\beta)\left(\alpha c_x - m_{x1} - m_{x2} - \frac{o_x(\alpha c_y - m_{y1} - m_{y2})}{o_y}\right)$$

FIG. 19 and Equations 4-7 show how to calculate the width and height of a document that is maximized vertically in its space. This depends on image aspect ratio and the space available for content in the container ratio so these formulas can easily be changed to fit horizontally a document image. As a consequence of having arbitrary size of borders in the object container, one should be aware that after magnification or reduction, the available space within the container image aspect ratio may not be the same and the document image may prefer to fits on the opposite axis to maximise its display surface.

Equations 4-7 could be easily reproduced in order to maximize an object horizontally, as seen in Equation 8.

$$o'_y = \frac{o_y o'_x}{o_x} \quad \text{Equation 8}$$

$$s_x = o'_x = \alpha c_x - m_{x1} - m_{x2}$$

$$p_{y1} = \beta\left(\alpha c_y - m_{y1} - m_{y2} - \frac{o_y(\alpha c_x - m_{x1} - m_{x2})}{o_x}\right)$$

$$p_{y2} = (1-\beta)\left(\alpha c_y - m_{y1} - m_{y2} - \frac{o_y(\alpha c_x - m_{x1} - m_{x2})}{o_x}\right)$$

Figure 20:
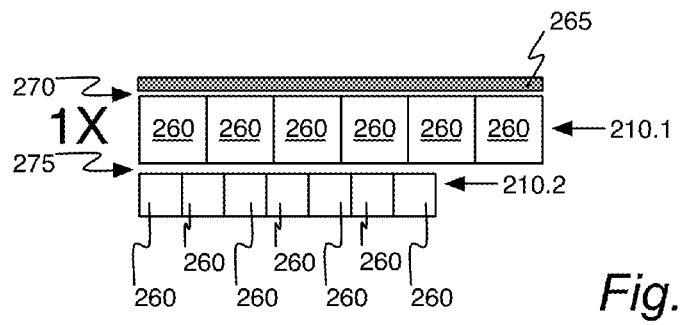
FIG. 20 is an illustrative schematic view of a group of axes of documents with intervening portions, margins and headers in accordance with an embodiment of the present invention.
Figure 21:
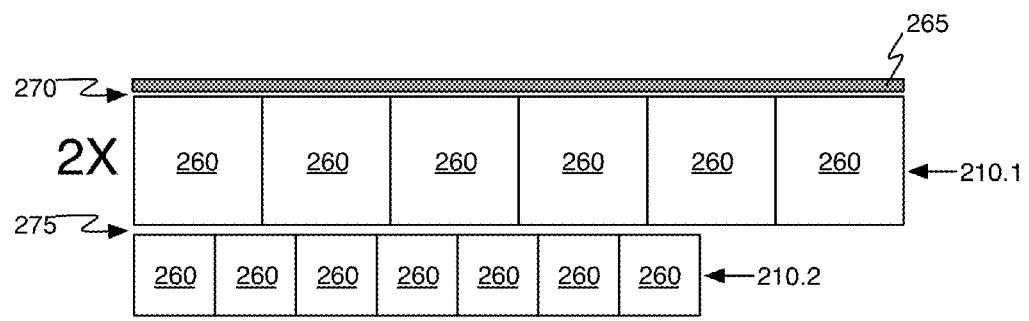
FIG. 21 is an illustrative schematic view of a magnified group of axes of documents with fixed intervening portions, margins and headers in accordance with an embodiment of the present invention.
Figure 22:
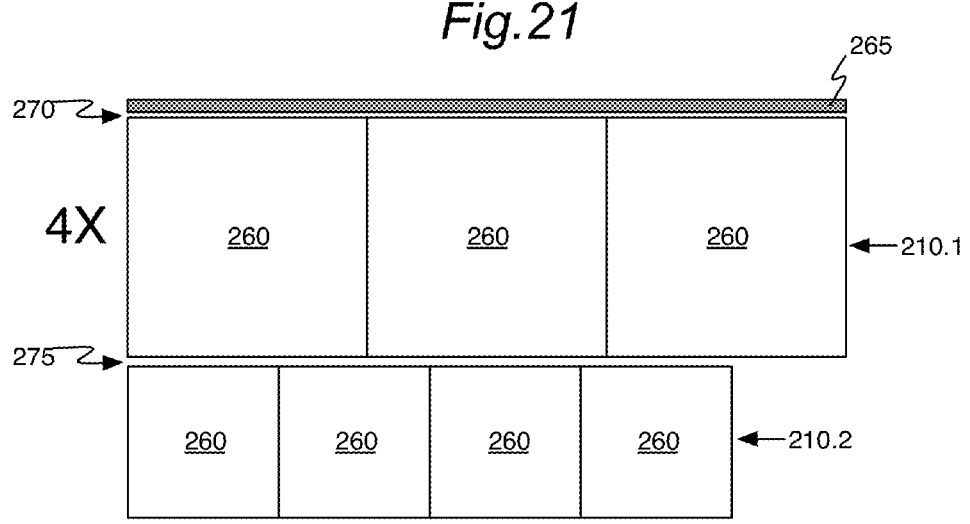
FIG. 22 is an illustrative schematic view of a magnified group of axes of documents with fixed intervening portions, margins and headers axis names in accordance with an embodiment of the present invention.

FIG. 20 illustrates two axes of objects 210.1 and 210.2 with appended header 265. FIG. 21 illustrates objects that are a magnification of objects from FIG. 20 by a factor of two (2) and FIG. 22 illustrates objects that are a magnification of objects from FIG. 20 by a factor of four (4). It can be appreciated that there is no longitudinal relative discrepancy between axis of objects 210.1 and axis of objects 210.2 despite the magnification. However, in the present embodiment illustrated in FIGS. 20-22, the header 265, intervening space 270 between the header 265 and its adjacent axis of objects 210.1 and inter-axis space 275 have respective fixed thicknesses.

Figure 23:
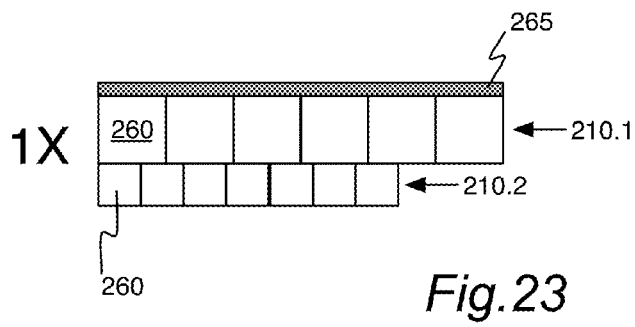
FIG. 23 is an illustrative schematic view of a group of axes of documents with a fixed size intervening portions and/or header in accordance with an embodiment of the present invention.
Figure 24:
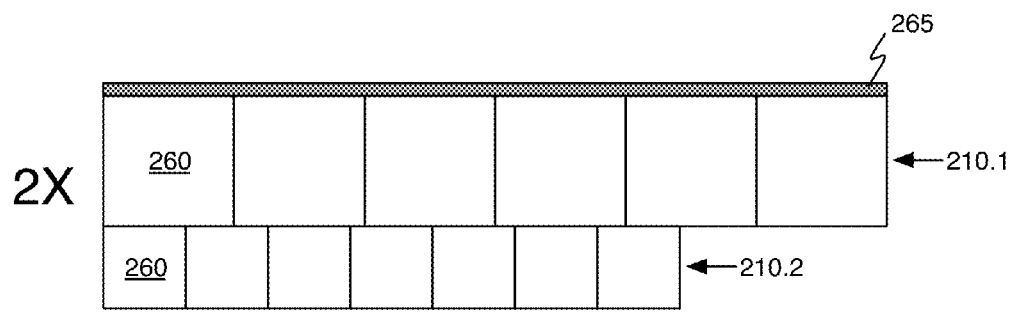
FIG. 24 is an illustrative schematic view of a magnified group of axes of documents with a fixed size intervening portions and/or header in accordance with an embodiment of the present invention.
Figure 25:
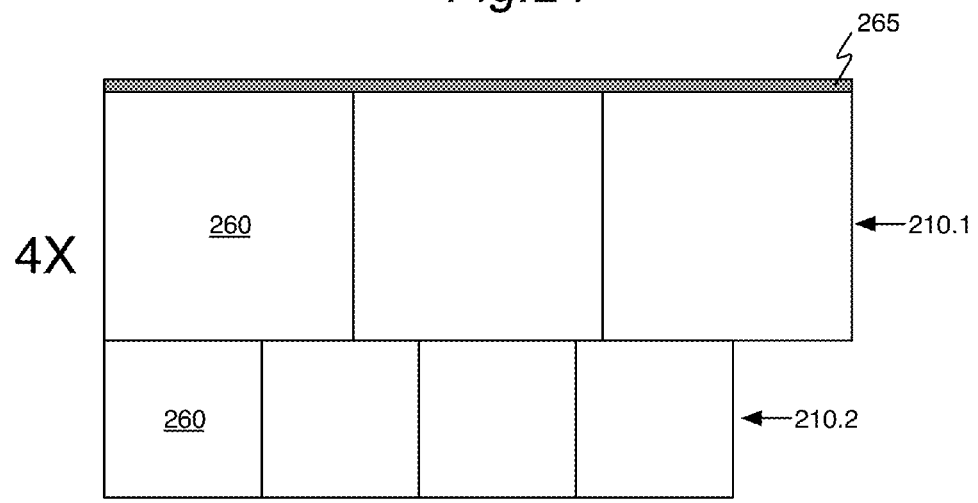
FIG. 25 is an illustrative schematic view of a magnified group of axes of documents with a fixed size intervening portions and/or header in accordance with an embodiment of the present invention.

Moving now to FIG. 23 through FIG. 25 illustrating an alternate embodiment to the embodiment illustrated in FIG. 20 through FIG. 22. In the embodiment of FIG. 25 through FIG. 25, the intervening space 270 between the header 265 and its adjacent axis of objects 210.1 and the inter-axis space 275 are absent to maximize the useful display area and also to simplify the rendering of the axes of objects 210.

Figure 26:
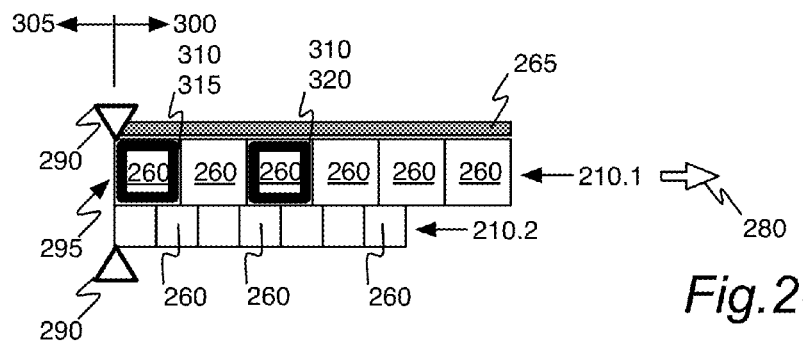
FIG. 26 is an illustrative schematic view of a group of axes of documents with a magnifiable size intervening portions and/or header and visual distinctive features applied to some document in accordance with an embodiment of the present invention.

The linear expansion 280 an axis of objects 210.1, 210.2 or a group of axes of objects as shown in FIG. 26 is a resultant of the magnification process. The visual rendering of the linear expansion of the axes of objects 210 can be directed by applying expansion anchors 290 to the group of axes of objects 210. The expansion anchors 290 of the present embodiment draw a vertical axis 295 at which the expansion of the axes of objects 210 remains fix and from which they can expands from both sides 300, 305. In the present situation the expansion anchors 290 are disposed on the extreme left side of the axes of objects 210 and expansion 280 only happens toward the right side 300. The effect of expansion toward the right 300 where the axes of objects 210 remain fixed along the vertical axis 295 defined between the two expansion anchors 290 can be appreciated from FIG. 26 and FIG. 27 illustrating a magnification by a factor of two (2) and FIG. 28 that illustrates a magnification of objects in FIG. 26 by a factor of four (4).

Figure 27:
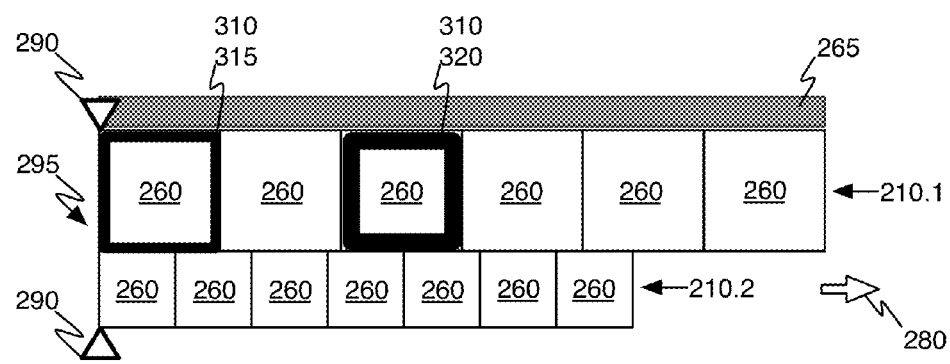
FIG. 27 is an illustrative schematic view of a group of axes of documents with a magnifiable size intervening portions and/or header and visual distinctive features applied to some document in accordance with an embodiment of the present invention.
Figure 28:
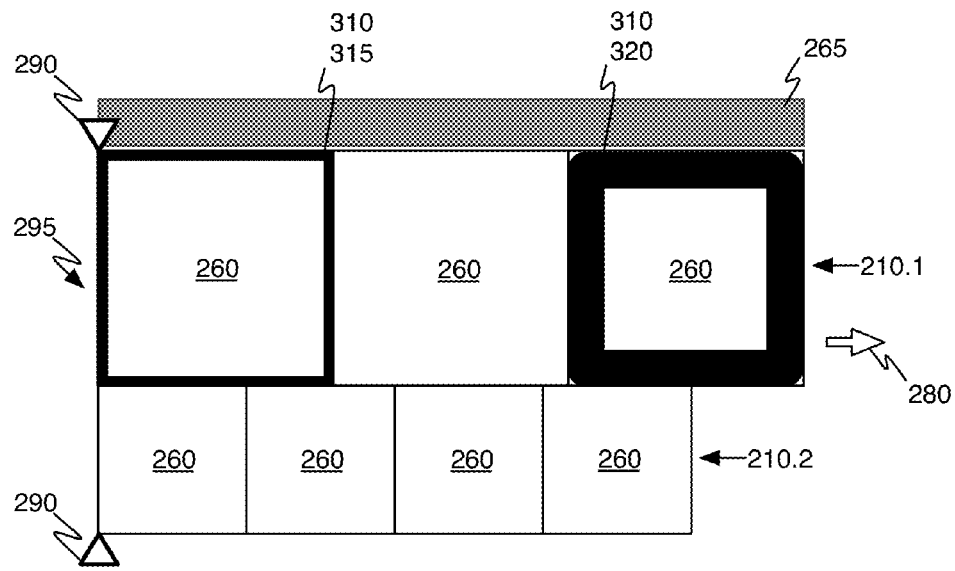
FIG. 28 is an illustrative schematic view of a group of axes of documents with a magnifiable size intervening portions and/or header and visual distinctive features applied to some document in accordance with an embodiment of the present invention.

Still on FIG. 26 through FIG. 28 one can appreciate that a document border 310, or an object border in the present example, can either remain with a fixed width 315 or be magnified with the object 320. The fixed width object border can be considered as a part of the margin in the object container illustrated in FIG. 19.

Figure 29:
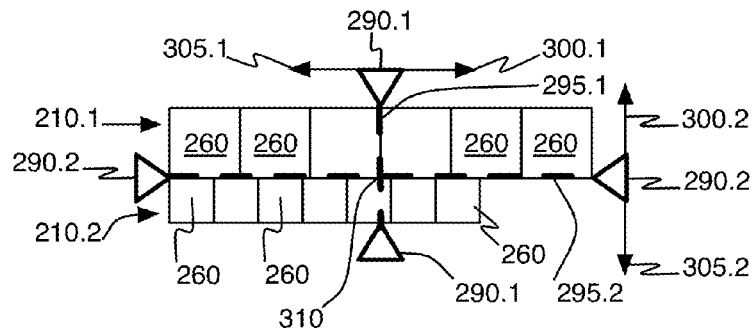
FIG. 29 is an illustrative schematic view of plurality of axes of documents with two marking axes in accordance with an embodiment of the present invention.

FIG. 29 shows that the expansion anchors 290 and its related vertical axis 295 can be horizontally movable to locate the vertical axis 295 at the desired position. The vertical expansion anchors 290 (now 290.1) and its related vertical axis 295 (now 295.1) are paired with a complementary horizontal expansion anchors 290.2 and a related horizontal axis 295.2 that can be vertically moved to locate the horizontal axis 295.2 at a desired location. The intersection of the vertical axis 290.1 and the horizontal axis 290.2 creates an expansion point 310 bout which expansion/reduction in all directions will occur.

Figure 30:
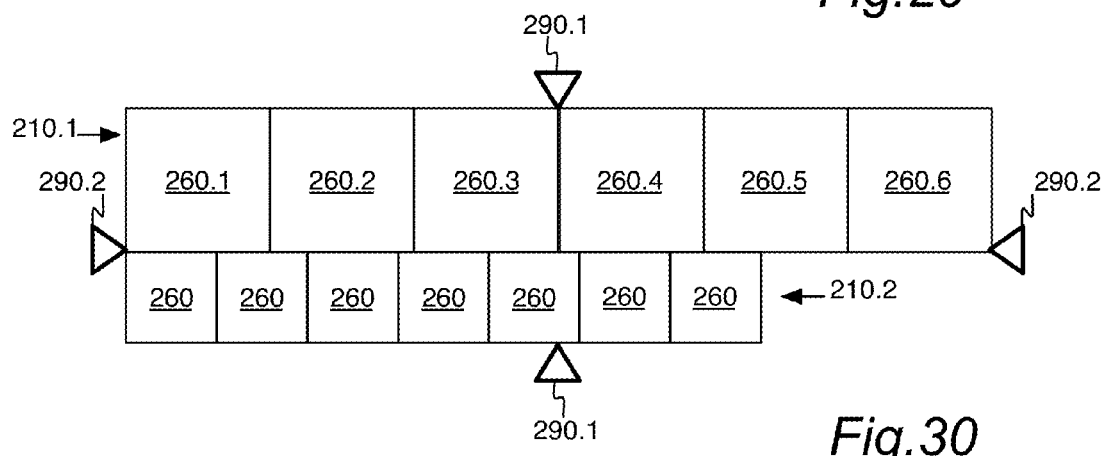
FIG. 30 is an illustrative schematic view of plurality of magnified axes of documents with two marking axes in accordance with an embodiment of the present invention.

The vertical expansion anchors 290.1 of the embodiment depicted in FIG. 30 can be used without the vertical axis 295.2

(not shown on FIG. 30). Similarly, the horizontal expansion anchors 290.2 can be used without the horizontal axis 295.2 (also not shown on FIG. 30). The vertical expansion anchors 290.1 can discretely be positioned between two objects 260.3 and 260.4 on axis of objects 210.1 (could be made in respect of any other axis). Likewise, the horizontal expansion anchors 290.2 can discretely be positioned between two axes of objects 210.1 and 210.2.

The expansion anchors 290 can alternatively be disposed adjacent to their respective edges 225, 230 of a display 320. This precise location for the expansion anchors 290 is convenient and intuitive for a user. A user could understand that the expansion anchor can be slided along the edge 225, 230 of the display 320 while not taking much space toward the center of the display 320. The vertical axis 290.1, the horizontal axis 290.2 and the expansion point 310. Can selectively be displayed only when the expansion anchors are moved and disappear from the display 320 after a period of time.

Figure 31:
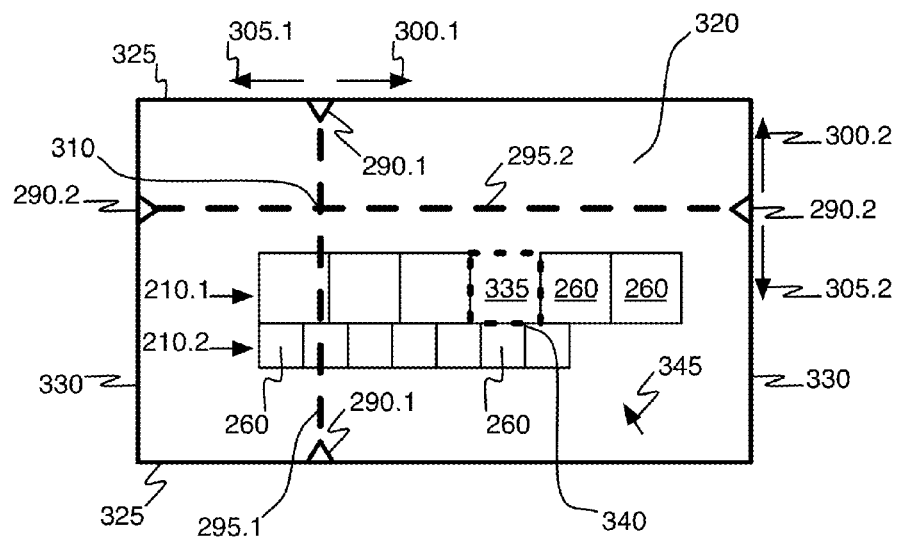
FIG. 31 is an illustrative schematic view of plurality of magnified axes of documents in a display area with two marking axes in accordance with an embodiment of the present invention.

Additional embodiments for determining the expansion point 320 are illustrated in FIG. 31. Firstly, an object 260, 335 can be selected to serve as the expansion point from which the expansion will occur. The selected object 335 is illustrated as being selected with a distinctive frame 340. Secondly, the position of a pointer 345 can alternatively be used to serve as the expansion point from which the expansion will occur.

FIG. 32 through FIG. 35 illustrate that the magnification and/or the reduction can be non-isometric (anisometric). That is to say that the magnification can be made only horizontally as depicted in FIG. 33 or be made only vertically as depicted in FIG. 34. The border 310 can remain of a fixed width 315 as illustrated in FIG. 32 through FIG. 35 to remain consistent with the portion of the object 260 that remains unmagnified. Consider $\alpha_x$ and $\alpha_y$ as magnification factor horizontally and vertically. Equation 9 shows how to calculate the internal space $s_x$ and $s_y$, the object dimension $o_x$ and $o_y$, and the padding $p_{x1}$ and $p_{x2}$ adapted from Equation 3 through 8. Note that like in Equations 4-8, the document image aspect ratio and the available space within the container image aspect ratio should be considered to determine if the image should be maximized horizontally or vertically.

$$s_x = \alpha_x t_x - m_{x1} - m_{x2} \quad \text{Equation 9}$$
$$s_y = \alpha_y t_y - m_{y1} - m_{y2}$$
$$o'_x = \frac{o_x o'_y}{o_y}$$
$$s_y = o'_y = \alpha_y c_y - m_{y1} - m_{y2}$$
$$p_{x1} = \beta\left(\alpha_x c_x - m_{x1} - m_{x2} - \frac{o_x(\alpha_y c_y - m_{y1} - m_{y2})}{o_y}\right)$$
$$p_{x2} = (1-\beta)\left(\alpha_x c_x - m_{x1} - m_{x2} - \frac{o_x(\alpha_y c_y - m_{y1} - m_{y2})}{o_y}\right)$$

Figure 36:
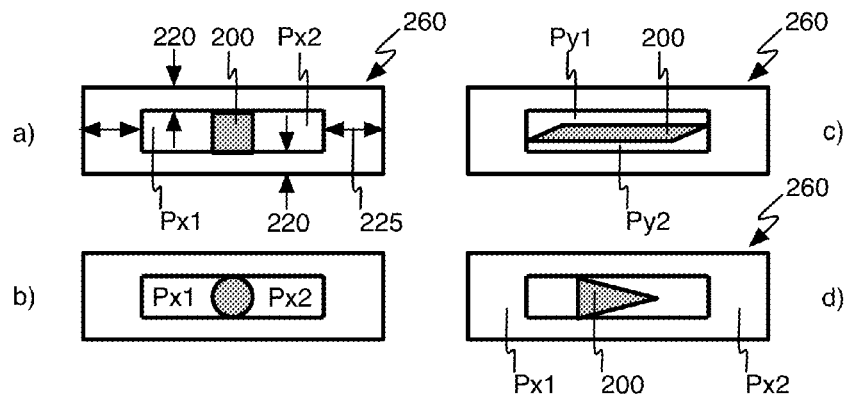
FIG. 36 is an schematic illustration of several shapes adapted to be maximized in document containers in accordance with an embodiment of the present invention.

FIG. 36 depicts various different shapes of objects 200 using in a variety of ways the padding area p within the margins 220, 225.

Figure 37:
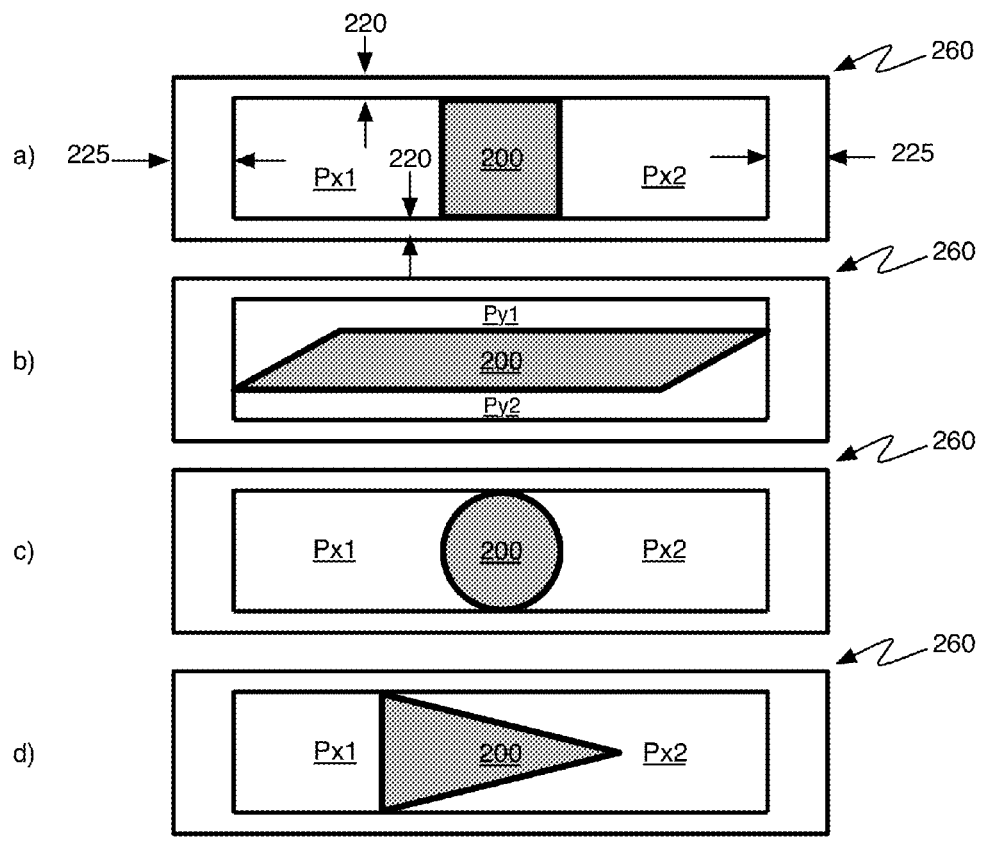
FIG. 37 is an schematic illustration of several shapes maximized in magnified document containers in accordance with an embodiment of the present invention.

FIG. 37 shows the same shapes of FIG. 36 magnified. One can appreciate the way margins remains fixed while the shape of object grows to the maximum size within these margins.

As in FIGS. 36-37, the object container and the margin may also use a variety of shapes. The particular formulas are not described here since all shape should be defined differently. Formulas referred above can be adapted by defining a padding margin around the subject shape.

Figure 38:
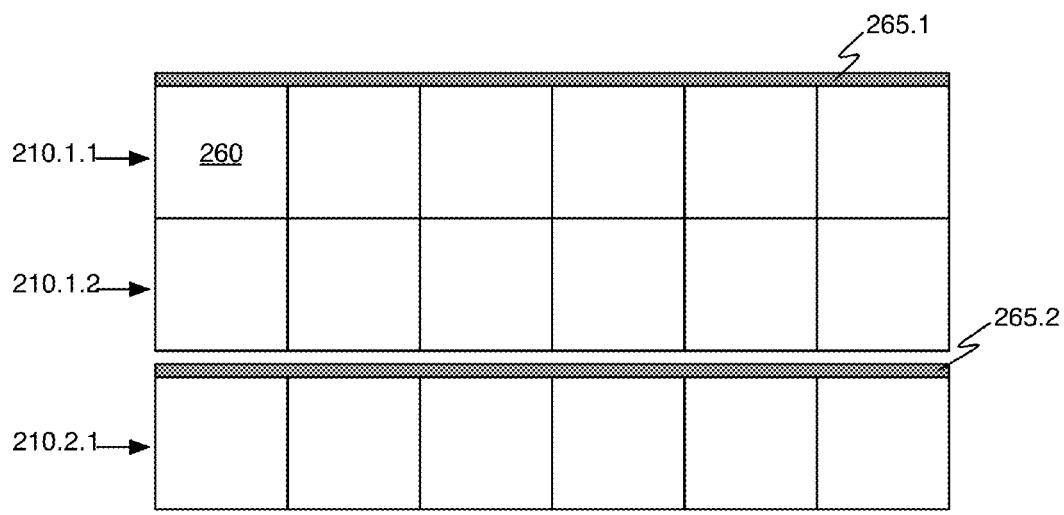
FIG. 38 is an illustrative schematic view of a group of axes of documents of equals dimension in accordance with an embodiment of the present invention.
Figure 39:
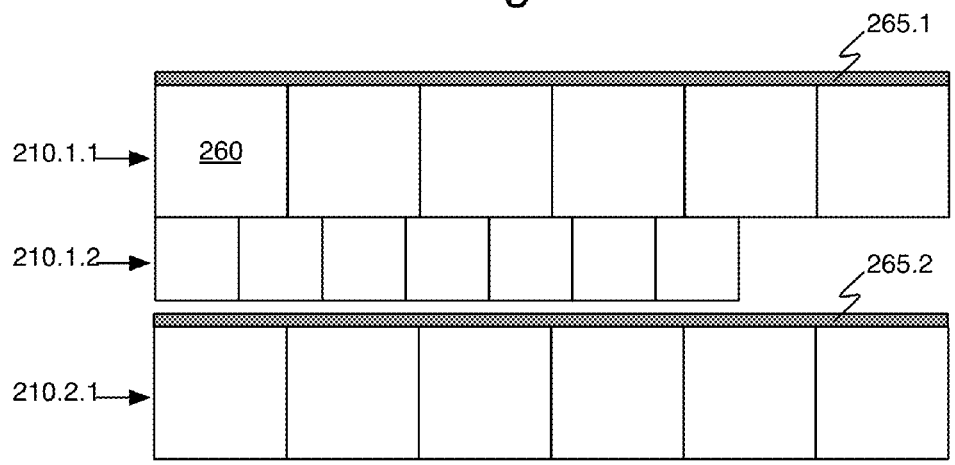
FIG. 39 is an illustrative schematic view of a group of a plurality of axes of documents in which one axis of documents is being reduced in accordance with an embodiment of the present invention.

Moving now to FIG. 38 illustrating another embodiment. Two groups of axes of documents 210 are shown. In this case, all documents 260 of each axis 210 have equal sizes. FIG. 39 shows the same two groups, now with the axis of document 210.1.2 reduced. This kind of magnification or reduction may not keep alignment between documents. Somehow, on a display, the position of the view may be kept centered on the magnified or reduced axis of document so the user does not lost its focus on the axis that is being magnified or reduced.

Figure 40:
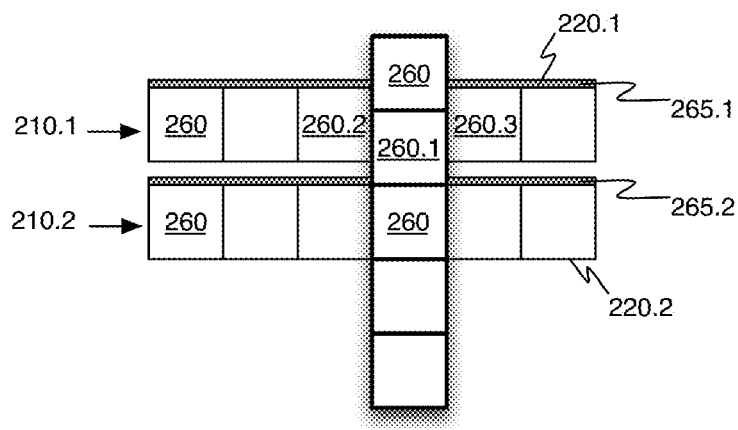
FIG. 40 is an illustrative schematic view of a plurality of axes of documents and a non-parallel axis of documents over one element of an axis of documents in accordance with an embodiment of the present invention.
Figure 41:
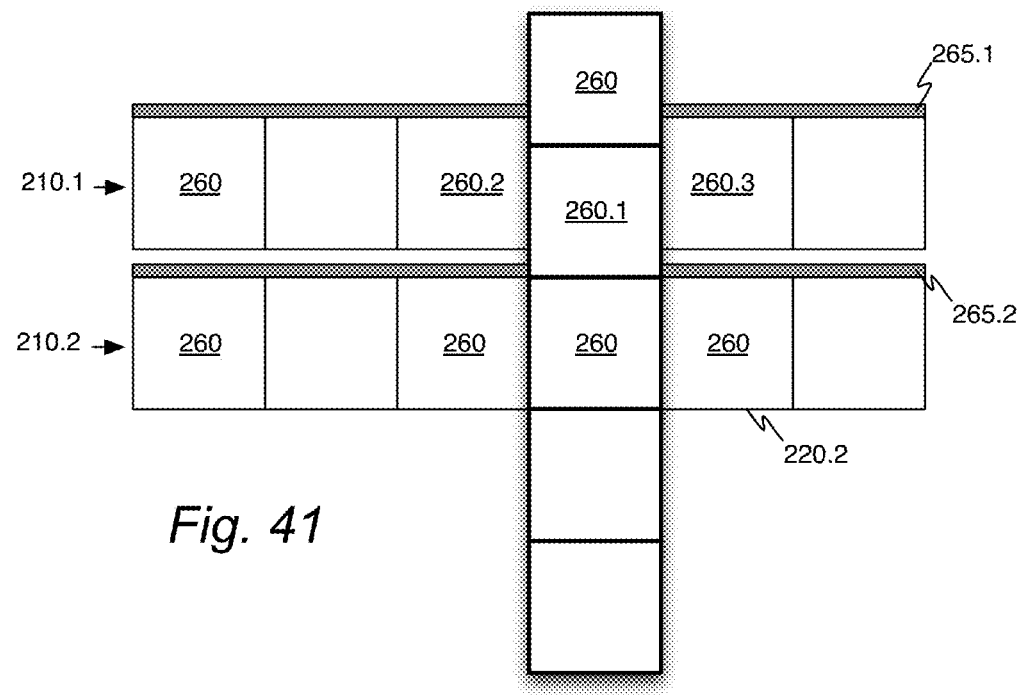
FIG. 41 is an illustrative schematic view of a plurality of magnified axes of documents and a non-parallel axis of documents over one document of another axis of documents in accordance with an embodiment of the present invention.

Non-parallel axes of documents may be used in a way described in the United States patent application publication referred to at the beginning of the present patent specification that is incorporated herein by reference. On FIG. 40, the space between the two groups 220 and the height of the headers 265 may be fixed or subject to resizing after magnification or reduction. A readjustment may be made on the space between the two groups 220 in other to prevent post magnification misalignment like shown after a magnification of a factor of two in FIG. 41. This readjustment may be made to keep the original positional aspect on documents 260.1, 260.2 and 260.3.

Figure 42:
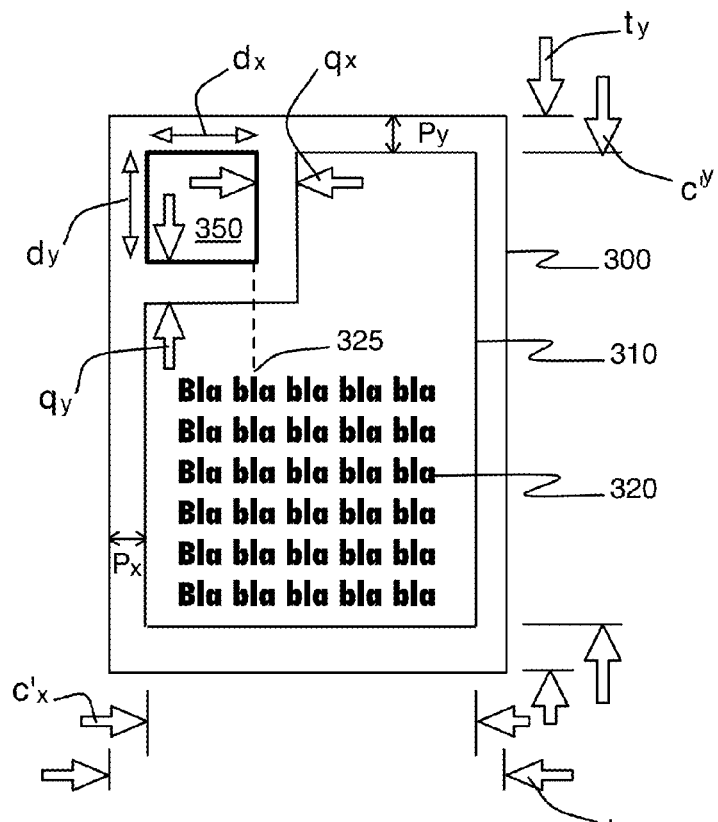
FIG. 42 is a schematic illustration of a web document with fixed intervening portions in accordance with an embodiment of the present invention.
Figure 43:
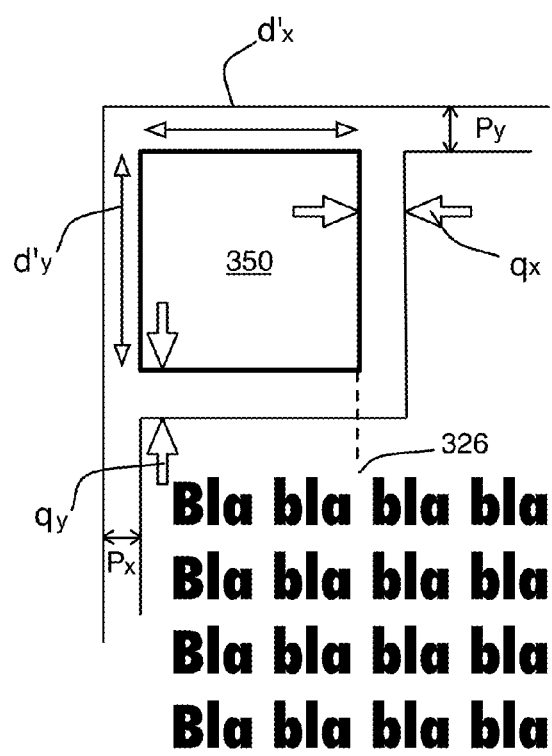
FIG. 43 is a schematic illustration of a magnified web page with fixed intervening portions in accordance with an embodiment of the present invention.

Another application of the method described in this patent application publication concerns document display systems like word processors, document viewer like a PDF viewer and webpage browsers. FIG. 42 depicts a layout used in a webpage 300. There may be a page margin of size $p_x$ and $p_y$ that encapsulate the webpage content 310. The webpage may content different part of text 320 and objects 350 such as images, chart, applet, internal frame, etc. that are presented. The webpage browser may keep margins $p_x$ and $p_y$ fixed and maximize space for the content 310. After magnification shown in FIG. 43, the size of the text 320 may be scaled at the same factor than the magnification of webpage content 310. This ratio may also be applied to the space reserved to the object 350. Consider $q_x$ and $q_y$, the right and bottom margin of the object 350. These margins can also be considered as fixed and the object 350 could be maximized in the space reserved within the margins by applying the formula described in Equation 3 recursively. One can appreciate in FIGS. 42 and 43 the way the right side of the object 350 is aligned with the text 325 and 326 after magnification. This shows how the object size is magnified to save more space after magnification and gives more to the content that is being shown.

The description and the drawings that are presented above are meant to be illustrative of the present invention. They are not meant to be limiting of the scope of the present invention. Modifications to the embodiments described may be made without departing from the present invention, the scope of which is defined by the following claims:

What is claimed is:

1. A method of magnifying an array of information elements having a plurality of sizes on a display, the method comprising:
  displaying a first plurality of information elements on the display with a first original size thereof, at least some of the plurality of information elements being surrounded by a margin thereof, the first plurality of information elements being juxtaposed in a substantially rectilinear arrangement along a first axis thereof, the information elements being disposed on the first axis on a basis of a common attribute,
  displaying a second plurality of information elements on the display with a second original size thereof, at least some of the plurality of information elements being surrounded by a margin thereof, the second plurality of information elements being juxtaposed in a substantially rectilinear arrangement along a second axis thereof, the information elements being disposed on the second axis on a basis of a common attribute;

modifying the first original size of the first plurality of information elements and the second original size of the second plurality of information elements, modification of the first plurality of information elements and the second original size of the second plurality of information elements comprising assembling at least a portion of the margin with respective information elements to characterize standardized objects;

applying a ratio to modify sizes of the standardized objects; and extracting the margin from the modified standardized object to determine a first modified size of the first plurality of information elements and a second modified size of the second plurality of information elements, wherein the first plurality of information elements and the second plurality of information elements are adapted to remain at a substantially constant relative rectilinear arrangement thereof before modifying the first original size of the first plurality of information elements and the second original size of the second plurality of information elements and after modifying the first original size of the first plurality of information elements and the second original size of the second plurality of information elements, whereby the relative rectilinear arrangement of the first plurality of information elements along the first axis thereof and the rectilinear arrangement of the second plurality of information elements along the second axis thereof remain substantially the same to prevent confusion of the user in regard to the respective axial locations of the displayed information elements.

2. The method of claim 1, wherein the first axis of information elements and the second axis of information elements are disposed parallel to one another.

3. The method of claim 1, wherein the first axis of information elements includes a timeline with time units and time separations thereof, and the second axis of information elements includes a timeline with time units and time separations thereof, the first axis and the second axis share time separations and wherein the time separations remain substantially at same respective locations thereof when collectively modifying the original size of the first plurality of information elements and the original size of the second plurality of information elements.

4. A method for collectively resizing objects having different sizes on a display area of a display, the method comprising:

displaying on the display area a first plurality of objects having a common attribute thereof, with intervening margins thereof, in a substantially rectilinear axial arrangement thereof, the first plurality of objects being of a first original size thereof;

displaying on the display area a second plurality of objects having a common attribute thereof, with intervening margins thereof, in a substantially rectilinear axial arrangement thereof, the second plurality of objects being of a second original size thereof, the first original size being different than the second original size and the first plurality of objects being concurrently displayed with the second plurality of objects at relative axial positions thereof; and directly resizing the first plurality of objects and the second plurality of objects, the resizing of the objects being independent of a size of the display area, wherein a thickness of the margins between two adjacent objects remains substantially constant when the first plurality of objects and the second plurality of objects are resized, wherein the relative axial positions between the axial arrangement of the first plurality of objects and the axial arrangement of the second plurality of objects remains substantially constant when resizing the first plurality of objects and the second plurality of objects, whereby the axial arrangement of the first plurality of objects and the second plurality of objects, before the modification of the original sizes, is substantially similar to the axial arrangement of the first plurality of objects and the second plurality of objects after the modification of the first original size and the second original size to prevent confusion of the user in regard to the respective axial locations of the displayed objects.

5. The method of claim 4, wherein at least some of the objects are user-selectable.

6. The method of claim 4, wherein the first plurality of objects and the second plurality of objects are parallelly displayed.

7. The method of claim 6, wherein the first plurality of objects and the second plurality of objects are juxtaposed to one another.

8. The method of claim 4, wherein the first plurality of objects is arranged along a first axis equidistantly distributing the objects thereof and the second plurality of objects is arranged along a second axis equidistantly distributing the objects thereof.

9. The method of claim 8, wherein at least some of the objects are documents.

10. The method of claim 4, wherein first plurality of objects and the second plurality of objects are disposed along a timeline.

11. The method of claim 4, wherein at least a portion of the margins is being associated with its respective object in a unified object for resizing thereof.

12. The method of claim 4, wherein the margin being disassociated from its respective object after the resizing for determining the modified size of the objects.

13. The method of claim 4, wherein the resizing of the objects is made in respect with an expansion anchor adapted to identify a position about which the objects remain fixed on the display area when resizing the objects and from where expansion and contraction of the objects on the display area are made.

14. The method of claim 13, wherein the expansion anchor is one of a vertical expansion anchor and an horizontal expansion anchor.

15. A non-transitory computer-readable medium having stored thereon computer-readable instructions that, when executed by a processor of a computer system, cause the computer system to perform operations for collectively resizing objects on a display area of a display, the operations comprising:

displaying on the display area a first plurality of objects having a common attribute thereof, with intervening margins thereof, in a substantially rectilinear axial arrangement thereof, the first plurality of objects being of a first original size thereof;

displaying on the display area a second plurality of objects having a common attribute thereof, with intervening margins thereof, in a substantially rectilinear axial arrangement thereof, the second plurality of objects being of a second original size thereof, the first original size being different than the second original size and the first plurality of objects being concurrently displayed with the second plurality of objects at relative axial positions thereof; and directly resizing the first plurality of objects and the second plurality of objects, the resizing of the objects being independent of a size of the display area, wherein a thickness of the margins between two adjacent objects remains substantially constant when the first plurality of objects and the second plurality of objects are resized, wherein the relative axial positions between the axial arrangement of the first plurality of objects and the axial arrangement of the second plurality of objects remains substantially constant when resizing the first plurality of objects and the second plurality of objects, whereby the axial arrangement of the first plurality of objects and the second plurality of objects, before the modification of the original sizes, is substantially similar to the axial arrangement of the first plurality of objects and the second plurality of objects after the modification of the first original size and the second original size to prevent confusion of the user in regard to the respective axial locations of the displayed objects.

16. The non-transitory computer-readable medium of claim 15, wherein at least some of the objects are user-selectable.

17. The non-transitory computer-readable medium of claim 15, wherein the first plurality of objects and the second plurality of objects are juxtaposed to one another.

18. The non-transitory computer-readable medium of claim 15, wherein the first plurality of objects is arranged along a first axis equidistantly distributing the objects thereof and the second plurality of objects is arranged along a second axis equidistantly distributing the objects thereof.

19. The non-transitory computer-readable medium of claim 16, wherein at least some of the objects are documents.

* * * * *